US008692099B2

(12) United States Patent
Sitrick

(10) Patent No.: US 8,692,099 B2
(45) Date of Patent: Apr. 8, 2014

(54) SYSTEM AND METHODOLOGY OF COORDINATED COLLABORATION AMONG USERS AND GROUPS

(75) Inventor: David H. Sitrick, Highland Park, IL (US)

(73) Assignee: Bassilic Technologies LLC

( * ) Notice: Subject to any disclaimer, the term of this patent is extended or adjusted under 35 U.S.C. 154(b) by 776 days.

(21) Appl. No.: 11/982,055

(22) Filed: Nov. 1, 2007

(65) Prior Publication Data

US 2008/0060499 A1 Mar. 13, 2008

Related U.S. Application Data

(63) Continuation of application No. 10/261,061, filed on Sep. 30, 2002, now Pat. No. 7,297,856, which is a
(Continued)

(51) Int. Cl.
*G10H 1/00* (2006.01)

(52) U.S. Cl.
USPC ............... 84/477 R; 84/600; 84/609; 84/610; 84/615; 84/634

(58) Field of Classification Search
None
See application file for complete search history.

(56) References Cited

U.S. PATENT DOCUMENTS 3,648,245 A * 3/1972 Dodds et al. .................. 345/157
3,955,466 A 5/1976 Goldmark
(Continued)

FOREIGN PATENT DOCUMENTS

DE 3839361 5/1990
DE 4200673 7/1993
(Continued)

OTHER PUBLICATIONS

United States Patent and Trademark Office, Final Office Action, U.S. Appl. No. 11/982,054, mailed Aug. 28, 2012, 42 pages.
(Continued)

*Primary Examiner* — Marlon Fletcher
(74) *Attorney, Agent, or Firm* — Perkins Coie LLP

(57) ABSTRACT

A musical workstation system produces a display presentation in one of a musical composition responsive to musical composition data and responsive to one or both of input variables and a selected operating mode. The system is comprised of (1) means to provide the musical composition data (such as local storage (ROM, RAM, CD-ROM, hard disk etc.), or via a communications interface to an external device (such as another music workstation, a master controller, a computer), a memory, a selection subsystem, a controller, and a display subsystem. The memory selectively stores the received original musical compositions. The selection subsystem determines a selected operating mode and display format. The controller, responsive to the selection subsystem, provides means for selectively controlling the storing of the musical composition data in memory and selectively processing (e.g. altering) the stored musical composition data responsive to the selected operating mode and the input variables to produce a particular one of a plurality of processed results, such as external communications, operating, mode, transformation to derivative musical compositions, etc. The music workstation can coordinate communications, or be a slave device, with one or more external devices, such as other music workstations, a master workstation, a controller, etc. The display system provides for selection of original compositions, creation of derivative compositions, distribution of compositions, monitoring of each performer's performance, group virtual performances, and also allows for local and distributed retrieval and editing of musical compositions.

45 Claims, 17 Drawing Sheets

Related U.S. Application Data

(63) continuation of application No. 09/492,218, filed on Jan. 27, 2000, now Pat. No. 7,157,638, which is a continuation of application No. 09/039,952, filed on Mar. 16, 1998, now Pat. No. 6,084,168, which is a continuation-in-part of application No. 08/677,469, filed on Jul. 10, 1996, now Pat. No. 5,728,960.

(56) References Cited

U.S. PATENT DOCUMENTS

| | | | |
|---|---|---|---|
| 4,012,979 | A | 3/1977 | Wemekamp |
| 4,260,229 | A | 4/1981 | Bloomstein |
| 4,350,070 | A | 9/1982 | Bahu |
| 4,386,551 | A | 6/1983 | Morgando |
| 4,468,204 | A | 8/1984 | Scott et al. |
| 4,484,507 | A | 11/1984 | Nakada et al. |
| 4,500,879 | A | 2/1985 | Smith, III et al. |
| 4,527,980 | A | 7/1985 | Miller |
| 4,547,851 | A | 10/1985 | Kurland |
| 4,553,222 | A | 11/1985 | Kurland et al. |
| 4,572,509 | A | 2/1986 | Sitrick |
| 4,591,928 | A | 5/1986 | Bloom et al. |
| 4,646,609 | A | 3/1987 | Teruo et al. |
| 4,688,105 | A | 8/1987 | Bloch et al. |
| 4,694,723 | A | 9/1987 | Shinohara et al. |
| 4,698,460 | A | 10/1987 | Krein et al. |
| 4,698,461 | A | 10/1987 | Meadows et al. |
| 4,707,845 | A | 11/1987 | Krein et al. |
| 4,745,836 | A | 5/1988 | Dannenberg |
| 4,766,581 | A | 8/1988 | Korn et al. |
| 4,779,510 | A * | 10/1988 | Van den Abbeel ......... 84/464 R |
| 4,823,367 | A | 4/1989 | Kreutzfeld |
| 4,827,532 | A | 5/1989 | Bloomstein |
| 4,843,568 | A | 6/1989 | Krueger et al. |
| 4,893,182 | A | 1/1990 | Gautraud et al. |
| 4,942,551 | A | 7/1990 | Klappert et al. |
| 4,976,182 | A | 12/1990 | Obuchi et al. |
| 5,001,632 | A | 3/1991 | Hall-Tipping |
| 5,002,491 | A * | 3/1991 | Abrahamson et al. ....... 434/322 |
| 5,046,004 | A | 9/1991 | Tsumura et al. |
| 5,053,757 | A | 10/1991 | Meadows |
| 5,054,360 | A | 10/1991 | Lisle et al. |
| 5,107,443 | A | 4/1992 | Smith et al. |
| 5,117,726 | A | 6/1992 | Lisle et al. |
| 5,126,639 | A | 6/1992 | Srivastava |
| 5,136,146 | A | 8/1992 | Anglin et al. |
| 5,142,620 | A * | 8/1992 | Watanabe et al. ............ 715/201 |
| 5,146,833 | A | 9/1992 | Lui |
| 5,148,154 | A | 9/1992 | MacKay et al. |
| 5,149,104 | A | 9/1992 | Edelstein |
| 5,153,829 | A | 10/1992 | Furuya et al. |
| 5,166,463 | A | 11/1992 | Weber |
| 5,176,520 | A * | 1/1993 | Hamilton ..................... 434/350 |
| 5,194,682 | A | 3/1993 | Okamura et al. |
| 5,204,969 | A | 4/1993 | Capps et al. |
| 5,208,413 | A | 5/1993 | Tsumura et al. |
| 5,225,618 | A | 7/1993 | Wadhams |
| 5,240,417 | A | 8/1993 | Smithson et al. |
| 5,247,126 | A | 9/1993 | Okamura et al. |
| 5,250,747 | A | 10/1993 | Tsumura |
| 5,270,475 | A | 12/1993 | Weiss et al. |
| 5,275,082 | A | 1/1994 | Kestner-Clifton et al. |
| 5,310,962 | A | 5/1994 | Kimpara et al. |
| 5,315,911 | A | 5/1994 | Ochi |
| 5,341,133 | A | 8/1994 | Savoy et al. |
| RE34,728 | E | 9/1994 | Hall-Tipping |
| 5,362,069 | A | 11/1994 | Hall-Tipping |
| 5,364,271 | A | 11/1994 | Aknin et al. |
| 5,367,614 | A | 11/1994 | Bisey |
| 5,386,568 | A | 1/1995 | Wold et al. |
| 5,400,687 | A | 3/1995 | Ishii |
| 5,414,256 | A | 5/1995 | Gumer et al. |
| 5,434,678 | A | 7/1995 | Abecassis |
| 5,464,946 | A | 11/1995 | Lewis |
| 5,469,740 | A | 11/1995 | French et al. |
| 5,488,196 | A | 1/1996 | Zimmerman et al. |
| 5,491,751 | A | 2/1996 | Paulson et al. |
| 5,496,179 | A | 3/1996 | Hoffman |
| 5,499,921 | A | 3/1996 | Sone |
| 5,510,572 | A | 4/1996 | Hayashi et al. |
| 5,511,053 | A | 4/1996 | Jae-Chang |
| 5,512,703 | A | 4/1996 | Usa |
| 5,513,129 | A | 4/1996 | Bolas et al. |
| 5,521,323 | A | 5/1996 | Paulson et al. |
| 5,521,324 | A | 5/1996 | Dannenberg et al. |
| 5,533,903 | A | 7/1996 | Kennedy |
| 5,534,917 | A | 7/1996 | MacDougall |
| 5,544,354 | A | 8/1996 | May et al. |
| 5,563,358 | A | 10/1996 | Zimmerman |
| 5,585,583 | A | 12/1996 | Owen |
| 5,585,585 | A | 12/1996 | Paulson et al. |
| 5,590,062 | A | 12/1996 | Nagamitsu et al. |
| 5,590,282 | A | 12/1996 | Clynes |
| 5,604,322 | A | 2/1997 | Kikuchi |
| 5,613,909 | A | 3/1997 | Stelovsky |
| 5,616,876 | A * | 4/1997 | Cluts ............................. 84/609 |
| 5,627,335 | A | 5/1997 | Rigopulos et al. |
| 5,636,036 | A | 6/1997 | Ashbey |
| 5,656,790 | A | 8/1997 | Adachi |
| 5,657,096 | A | 8/1997 | Lukacs |
| 5,665,927 | A | 9/1997 | Taki et al. |
| 5,689,077 | A | 11/1997 | Jasinski |
| 5,689,641 | A | 11/1997 | Ludwig et al. |
| 5,704,042 | A | 12/1997 | Hester et al. |
| 5,728,960 | A | 3/1998 | Sitrick |
| 5,728,962 | A | 3/1998 | Goede |
| 5,730,140 | A | 3/1998 | Fitch |
| 5,746,605 | A | 5/1998 | Kennedy |
| 5,758,110 | A | 5/1998 | Boss et al. |
| 5,760,323 | A * | 6/1998 | Romero et al. ............. 84/470 R |
| 5,774,117 | A | 6/1998 | Kukkal et al. |
| 5,790,818 | A | 8/1998 | Martin |
| 5,791,351 | A | 8/1998 | Curchod |
| 5,823,788 | A * | 10/1998 | Lemelson et al. ............ 434/350 |
| 5,825,905 | A | 10/1998 | Kikuchi |
| 5,826,578 | A | 10/1998 | Curchod |
| 5,852,251 | A | 12/1998 | Su et al. |
| 5,852,252 | A | 12/1998 | Takano |
| 5,864,078 | A | 1/1999 | Koevering |
| 5,878,403 | A * | 3/1999 | DeFrancesco et al. ......... 705/38 |
| 5,880,388 | A | 3/1999 | Kajiyama et al. |
| 5,884,249 | A | 3/1999 | Namba et al. |
| 5,906,494 | A | 5/1999 | Ogawa et al. |
| 5,942,710 | A | 8/1999 | Hayakawa et al. |
| 5,952,597 | A | 9/1999 | Weinstock et al. |
| 5,956,485 | A | 9/1999 | Perlman |
| 5,995,951 | A | 11/1999 | Ferguson |
| 6,028,603 | A | 2/2000 | Wang et al. |
| 6,037,936 | A | 3/2000 | Ellenby et al. |
| 6,066,790 | A | 5/2000 | Freeland et al. |
| 6,084,167 | A | 7/2000 | Akimoto et al. |
| 6,084,168 | A | 7/2000 | Sitrick |
| 6,085,233 | A * | 7/2000 | Jeffrey et al. ................. 709/216 |
| 6,097,389 | A | 8/2000 | Morris et al. |
| 6,115,036 | A | 9/2000 | Yamato et al. |
| 6,202,061 | B1 | 3/2001 | Khosla et al. |
| 6,243,725 | B1 | 6/2001 | Hempleman et al. |
| 6,348,648 | B1 | 2/2002 | Connick, Jr. |
| 6,483,019 | B1 | 11/2002 | Hamilton |
| 6,526,424 | B2 | 2/2003 | Kanno et al. |
| 6,554,706 | B2 | 4/2003 | Kim et al. |
| 6,574,625 | B1 | 6/2003 | Bates et al. |
| 6,720,949 | B1 | 4/2004 | Pryor et al. |
| 6,740,802 | B1 | 5/2004 | Browne, Jr. |
| 6,789,044 | B2 | 9/2004 | Claussen |
| 6,909,708 | B1 * | 6/2005 | Krishnaswamy et al. .... 370/352 |
| 7,012,182 | B2 | 3/2006 | Nishitani et al. |
| 7,019,204 | B2 | 3/2006 | Terada |
| 7,028,267 | B1 | 4/2006 | Beezer et al. |
| 7,074,999 | B2 | 7/2006 | Sitrick et al. |
| 7,098,392 | B2 | 8/2006 | Sitrick et al. |
| 7,122,731 | B2 * | 10/2006 | Isozaki ........................... 84/615 |
| 7,157,638 | B1 | 1/2007 | Sitrick |
| 7,297,856 | B2 | 11/2007 | Sitrick |

(56) References Cited

U.S. PATENT DOCUMENTS

| | | | |
|---|---|---|---|
| 7,307,653 | B2 | 12/2007 | Dutta |
| 7,342,165 | B2* | 3/2008 | Gotfried .................. 84/609 |
| 7,423,213 | B2 | 9/2008 | Sitrick |
| 7,437,683 | B1 | 10/2008 | Beezer et al. |
| 7,612,278 | B2 | 11/2009 | Sitrick et al. |
| 7,633,521 | B2 | 12/2009 | Perlman et al. |
| 7,697,030 | B2 | 4/2010 | Terada et al. |
| 7,782,358 | B2 | 8/2010 | Nieminen et al. |
| 7,989,689 | B2 | 8/2011 | Sitrick et al. |
| 8,003,872 | B2 | 8/2011 | Lopiccolo et al. |
| 8,053,657 | B2 | 11/2011 | Sitrick et al. |
| 2001/0022127 | A1 | 9/2001 | Chiurazzi et al. |
| 2001/0029829 | A1 | 10/2001 | Moe |
| 2001/0037719 | A1 | 11/2001 | Gardner et al. |
| 2002/0026865 | A1 | 3/2002 | Akahori |
| 2002/0053078 | A1* | 5/2002 | Holtz et al. .................. 725/14 |
| 2002/0144586 | A1* | 10/2002 | Connick, Jr. .................. 84/478 |
| 2003/0100965 | A1 | 5/2003 | Sitrick et al. |
| 2003/0150317 | A1* | 8/2003 | Hamilton .................. 84/477 R |
| 2004/0000225 | A1 | 1/2004 | Nishitani et al. |
| 2004/0040433 | A1 | 3/2004 | Errico |
| 2005/0120865 | A1* | 6/2005 | Tada .................. 84/600 |
| 2006/0125691 | A1 | 6/2006 | Menache et al. |
| 2006/0220882 | A1 | 10/2006 | Makino |
| 2006/0288842 | A1 | 12/2006 | Sitrick et al. |
| 2007/0005428 | A1* | 1/2007 | Jacobs et al. .................. 705/14 |
| 2007/0051227 | A1* | 3/2007 | Gotfried .................. 84/600 |
| 2007/0146370 | A1 | 6/2007 | Gordon |
| 2007/0260985 | A1 | 11/2007 | Utagawa et al. |
| 2008/0065983 | A1 | 3/2008 | Sitrick |
| 2008/0072156 | A1 | 3/2008 | Sitrick |
| 2008/0125289 | A1 | 5/2008 | Pryor et al. |
| 2008/0136775 | A1 | 6/2008 | Conant |
| 2012/0057012 | A1 | 3/2012 | Sitrick et al. |

FOREIGN PATENT DOCUMENTS

| | | |
|---|---|---|
| EP | 0853308 | 7/1998 |
| FR | 2670599 | 6/1992 |
| FR | 2762130 | 10/1998 |
| GB | 2279493 | 1/1995 |
| GB | 2293915 | 4/1996 |
| GB | 2349736 | 11/2000 |
| JP | 60253082 | 12/1985 |
| JP | 01099169 | 4/1989 |
| JP | 01113785 | 5/1989 |
| JP | 05073042 | 3/1993 |
| JP | 06004071 | 1/1994 |
| JP | 06274158 | 9/1994 |
| JP | 07020858 | 1/1995 |
| JP | 08115081 | 5/1996 |
| JP | 08123416 | 5/1996 |
| JP | 09034446 | 2/1997 |
| JP | 09097057 | 4/1997 |
| JP | 09114453 | 5/1997 |
| JP | 09244524 | 9/1997 |
| WO | WO-9410680 | 5/1994 |
| WO | WO-9850900 | 11/1998 |
| WO | WO-0156013 | 8/2001 |
| WO | WO-2004070543 | 8/2004 |

OTHER PUBLICATIONS

"EPX-AA2000 PCMCIA Audio", Eiger Labs, Inc., 1995.
"Guide-Light System", Yamaha, 1996.
"Music Time®", MIDI Workshop™, Passport Design, Inc., Oct. 1995.
"Professional MIDI Sequencing & Production: Performer®", 1995.
"Summit", Apex, Avmedia, Summit SST, AVM Technology, Inc., Jan. 8, 1996.
Advertisement, "Autoscore", Wildcat Canyon Software, Oct. 19, 1995.
United States Patent and Trademark Office, Non-Final Office Action, U.S. Appl. No. 13/196,867, mailed Sep. 20, 2012, 27 pages.
United States Patent and Trademark Office, Advisory Action, U.S. Appl. No. 11/982,054, mailed Nov. 8, 2012, 2 pages.
United States Patent and Trademark Office, Final Office Action, U.S. Appl. No. 13/196,867, mailed Apr. 23, 2013, 9 pages.
"Computer Graphics Visual Effects for Terminator 2: Judgment Day," Siggraph 93: Course Notes 20: Computer Graphics in Visual Effects, 20th International Conference on Computer Graphics and Interactive Techniques; Aug. 1993; sec.3, pp. 1-15; University of California; San Diego, CA, USA.
"Electronic Systems", NASA Tech Briefs, vol. 19, No. 12, Dec. 1995, p. 4041.
"Film Audio Heads Into the Digital Domain", Film & Video—The Production Magazine, p. 2836, Apr., 1991.
"Finale: The art of Music Notation," 1992, vol. 2 Encyclopedia, 3.0 for Macintosh, 308 pages, Coda Music Software, Eden Prairie, Minnesota.
"Integrating digital Pens and Finger Touch", Electronic Design, Dec. 16, 1996, pp. 98, 100, 104.
"Mission Accomplished", NASA Tech Briefs, vol. 19, No. 12, Dec. 1995.
"Motion Capture", Next Generation, Oct. 1995, pp. 49-55.
"Practica Musica™—Version 3", ARS Nova Software, 1996.
"Professional Quick Time Audio", VideoSystems, Oct. 1995, pp. 64-65.
"Programming 3-D Software", VideoSystems, Oct. 1995.
"Songworks", ARS Nova Software, 1996.
"Soundstation: Digital Audio Production Systems for Professionals, Product Guide," Digital Audio Research Limited, London, England, 1990.
"The Making of Rebel Assault", Multimedia World, Oct. 1995, pp. 62-63, 65, 67.
"The Story of Waldo C. Graphic," 3-D Character Animation by Computer, Course #4, ACM Siggraph 89, Jul. 1989, pp. 65-79, Boston, MA, USA.
"Wordfit System for Automatic Dialogue Synchronization," Digital Audio Research, 1985, Rev. 6/85, Digital Audio Research Limited, London, England.
"Wordfit User Manual," 1985, pjb, usmtitle-v1.1, Digital Audio Research Limited, London, England.
Advertisement for ISCAN "Headhunter", NASA Tech Briefs, vol. 19, No. 12, Dec. 1995.
Blake, Larry, "Digital Sound for Motion Pictures, Including Production Recording and Random-Access," Recording Engineer Producer, Oct. 1985, pp. 122-136, vol. 16, No. 5.
Bloom, P.J.; Marshall, G.D., "A Digital Processing System for Automatic Dialogue Post-Synchronization," SMPTE Journal, Jun. 1984, pp. 566-569.
Chadwick, John E.; Haumann, David R.; Parent, Richard E, " Layered Construction for Deformable Animated Characters," Computer Graphics, Jul. 1989, pp. 243-252, vol. 23, No. 3, ACM-0-89791-312-4/89/007/0243.
Christopher, Abigail, "Siggraph '85, Part II: The Making of 'Brilliance',Achieving the Impossible in Special Effects," Computer Graphics World; Jul. 1985; pp. 32-34 and 36; PennWell.
Dasna, Orya et al., "Muse: Digital Music Stand for Symphony Musicians," Interactions Design Awards, May/Jun. 1996, pp. 27-35.
Ditlow et al., "Paging of Display Screen Images Using Footswitch and Digital Interface," ISM Technical Disclosure Bulletin, Jan. 1, 1989, pp. 252-254.
Goldman, Clint, "Abel, Ketchum Create a Sexy robot for Can Council," Back Stage; Jan. 25, 1985; pp. 1, 10.
Graefe, Christopher et al., "Designing the muse: A Digital Music Stand for the Symphony Musician," Apr. 13-18, 1996, pp. 436-441 and 521-524, Design Briefings, ACM/SIGCHI Conference on Human Factors in Computing Systems, Vancouver, British Columbia, Canada.
Marshall, G.D.; Bloom, P.J., "Wordfit: a Digital Audio Signal Processing System for Automatic Time Alignment of Post-Synched Dialog," The BKSTS Journal, Apr. 1984, 4 pages; beginning on p. 158, British Kinematograph Sound & Television Society.
Mellor, David, "Digital Audio Recorder," Sound on Sound, Apr. 1990.
Mellor, David, "Wordfit Automatic Dialogue Synchronization," Audio Media, Mar. 1991.
Music Object Oriented Distributed System (Moods) 1994.

(56) References Cited

OTHER PUBLICATIONS

Parent, Rick; King, Scott; Fujimura, Osamu, "Issues with Lip Sync Animation: Can You Read My Lips?" Ohio State University; University of Otago, 2002.
Siggraph 1990: Course Notes 17: Computer Graphics in Visual Effects, 17th International Conference on Computer graphics and Interactive Techniques, Aug. 1990, University of California, San Diego, CA, USA.
Strutt, Lionel, "Automated Dialog Replacement Using the Computer," The BKSTS Journal, Mar. 1981, pp. 196-198, vol. 63, British Kinematograph Sound & Television Society.
Tremaine, Howard M., "Audio Cyclopedia," 1973, pp. 864-871, Second Edition, IBSN: 0-672-20675-7, Howard W. Sams & Co., Inc., Indianapolis, IN, USA.
Williams, Lance, "Performance-Driven Facial Animation," Computer Graphics, Aug. 1990, pp. 235-242, vol. 24, No. 4, ACM-0-89791-344-2/90/008/0235.
Information Disclosure Statement filed in Sitrick, U.S. Appl. No. 08/677,469, Sep. 12, 1996.
"EPX-AA2000 PCMCIA Audio", Eiger Labs, Inc.
"Guide-Light System", Yamaha.
"Music Time®", MIDI Workshop™, Passport Design, Inc.
"Professional MIDI Sequencing & Production: Performer®".
"Summit", Apex, Avmedia, Summit SST, AVM Technology, Inc.
Advertisement, "Autoscore", Wildcat Canyon Software.
Bellini, P., P. Nesi, M.B. Spinu, "Cooperative Visual Manipulation of Music Notation", MOODS with newly cited reference pp., 26 pages, printed Apr. 28, 2006; cited by Examiner in U.S. Appl. No. 10/261,061 Office Action, May 5, 2006.
Information Disclose Statement filed Sitrick, U.S. Appl. No. 08/677,469, Sep. 12, 1996, 3 pages.
International Search Report for PCT/US2001/002395, mailed Jun. 13, 2001, 2 pages.
International Search Report for PCT/US2004/002492, mailed Mar. 28, 2006, 1 page.
International Preliminary Examination Authority, PCT Written Opinion, PCT/US2001/002395, mailed Nov. 6, 2001, 12 pages.
International Preliminary Examination Report, PCT/US2001/002395, mailed Feb. 27, 2002, 24 pages.
International Searching Authority, PCT Written Opinion, PCT/US2004/002492, mailed Mar. 28, 2006, 5 pages.
United States Patent and Trademark Office, Non-Final Office Action, U.S. Appl. No. 11/982,054, mailed Jul. 21, 2011, 26 pages.
United States Patent and Trademark Office, Non-Final Office Action, U.S. Appl. No. 11/982,054, mailed Mar. 23, 2012, 31 pages.
United States Patent and Trademark Office, Restriction Requirement, U.S. Appl. No. 11/982,222, mailed Mar. 17, 2011, 7 pages.
United States Patent and Trademark Office, Non-Final Office Action, U.S. Appl. No. 11/982,222, mailed Jun. 22, 2011, 16 pages.
United States Patent and Trademark Office, Final Office Action, U.S. Appl. No. 11/982,222, mailed Mar. 30, 2012, 17 pages.
United States Patent and Trademark Office, Non-Final Office Action, U.S. Appl. No. 12/563,081, mailed Oct. 29, 2010, 8 pages.
United States Patent and Trademark Office, Notice of Allowance, U.S. Appl. No. 12/563,081, mailed Jun. 14, 2011, 7 pages.
United States Patent and Trademark Office, Notice of Allowance, U.S. Appl. No. 12/563,081, mailed Sep. 2, 2011, 5 pages.
United States Patent and Trademark Office, Restriction Requirement, U.S. Appl. No. 09/492,218, mailed Nov. 21, 2000, 5 pages.
United States Patent and Trademark Office, Non-Final Office Action, U.S. Appl. No. 09/492,218, mailed Mar. 20, 2001, 14 pages.
United States Patent and Trademark Office, Non-Final Office Action, U.S. Appl. No. 09/492,218, mailed Oct. 11, 2001, 6 pages.
United States Patent and Trademark Office, Non-Final Office Action, U.S. Appl. No. 09/492,218, mailed May 9, 2001, 8 pages.
United States Patent and Trademark Office, Non-Final Office Action, U.S. Appl. No. 09/492,218, mailed Oct. 22, 2002, 7 pages.
United States Patent and Trademark Office, Non-Final Office Action, U.S. Appl. No. 09/492,218, mailed May 30, 2003, 7 pages.
United States Patent and Trademark Office, Final Office Action, U.S. Appl. No. 09/492,218, mailed Oct. 21, 2003, 7 pages.
United States Patent and Trademark Office, Advisory Action, U.S. Appl. No. 09/492,218, mailed Mar. 17, 2004, 4 pages.
United States Patent and Trademark Office, Non-Final Office Action, U.S. Appl. No. 09/492,218, mailed Jul. 13, 2004, 7 pages.
United States Patent and Trademark Office, Final Office Action, U.S. Appl. No. 09/492,218, mailed Jan. 26, 2005, 8 pages.
United States Patent and Trademark Office, Notice of Allowance, U.S. Appl. No. 09/492,218, mailed Jun. 2, 2005, 13 pages.
United States Patent and Trademark Office, Notice of Allowance, U.S. Appl. No. 09/492,218, mailed Jan. 24, 2006, 6 pages.
United States Patent and Trademark Office, Supplemental Notice of Allowability, U.S. Appl. No. 09/492,218, mailed Jun. 19, 2006, 2 pages.
United States Patent and Trademark Office, Non-Final Office Action, U.S. Appl. No. 10/261,061, mailed Sep. 12, 2003, 6 pages.
United States Patent and Trademark Office, Final Office Action, U.S. Appl. No. 10/261,061, mailed Mar. 12, 2004, 6 pages.
United States Patent and Trademark Office, Non-Final Office Action, U.S. Appl. No. 10/261,061, mailed Dec. 2, 2004, 5 pages.
United States Patent and Trademark Office, Final Office Action, U.S. Appl. No. 10/261,061, mailed May 19, 2005, 7 pages.
United States Patent and Trademark Office, Non-Final Office Action, U.S. Appl. No. 10/261,061, mailed May 5, 2006, 9 pages.
United States Patent and Trademark Office, Non-Final Office Action, U.S. Appl. No. 10/261,061, mailed Dec. 15, 2006, 7 pages.
United States Patent and Trademark Office, Notice of Allowance, U.S. Appl. No. 10/261,061, mailed Jul. 6, 2007, 11 pages.
United States Patent and Trademark Office, Non-Final Office Action, U.S. Appl. No. 10/323,526, mailed Jun. 5, 2006, 12 pages.
United States Patent and Trademark Office, Final Office Action, U.S. Appl. No. 10/323,526, mailed Jan. 19, 2007, 9 pages.
United States Patent and Trademark Office, Non-Final Office Action, U.S. Appl. No. 10/323,526, mailed Nov. 1, 2007, 11 pages.
United States Patent and Trademark Office, Final Office Action, U.S. Appl. No. 10/323,526, mailed Jul. 30, 2008, 10 pages.
United States Patent and Trademark Office, Advisory Action, U.S. Appl. No. 10/323,526, mailed Nov. 28, 2008, 4 pages.
United States Patent and Trademark Office, Non-Final Office Action, U.S. Appl. No. 10/323,526, mailed Jan. 23, 2009, 7 pages.
United States Patent and Trademark Office, Non-Final Office Action, U.S. Appl. No. 10/323,526, mailed May 13, 2009, 8 pages.
United States Patent and Trademark Office, Notice of Non-Compliant Amendment, U.S. Appl. No. 10/323,526, mailed Dec. 11, 2009, 3 pages.
United States Patent and Trademark Office, Non-Final Office Action, U.S. Appl. No. 10/323,526, mailed Apr. 19, 2010, 14 pages.
United States Patent and Trademark Office, Final Office Action, U.S. Appl. No. 10/323,526, mailed Oct. 1, 2010, 6 pages.
United States Patent and Trademark Office, Notice of Allowance, U.S. Appl. No. 10/323,526, mailed Feb. 23, 2011, 5 pages.
United States Patent and Trademark Office, Supplemental Notice of Allowability, U.S. Appl. No. 10/323,526, mailed Jun. 30, 2011, 4 pages.
United States Patent and Trademark Office, Non-Final Office Action, U.S. Appl. No. 11/340,017, mailed Sep. 25, 2006, 11 pages.
United States Patent and Trademark Office, Non-Final Office Action, U.S. Appl. No. 11/340,017, mailed May 7, 2007, 11 pages.
United States Patent and Trademark Office, Notice of Allowance, U.S. Appl. No. 11/340,017, mailed Jan. 9, 2008, 4 pages.
United States Patent and Trademark Office, Notice of Allowance, U.S. Appl. No. 11/340,017, mailed Jul. 1, 2008, 2 pages.
United States Patent and Trademark Office, Non-Final Office Action, U.S. Appl. No. 10/354,062, mailed Dec. 10, 2004, 9 pages.
United States Patent and Trademark Office, Notice of Allowance, U.S. Appl. No. 10/354,062, mailed Apr. 27, 2005, 7 pages.
United States Patent and Trademark Office, Non-Final Office Action, U.S. Appl. No. 10/354,062, mailed Aug. 23, 2005, 10 pages.
United States Patent and Trademark Office, Notice of Allowance, U.S. Appl. No. 10/354,062, mailed Jan. 27, 2006, 6 pages.
United States Patent and Trademark Office, Non-Final Office Action, U.S. Appl. No. 10/353,656, mailed Dec. 10, 2004, 9 pages.

(56) References Cited

OTHER PUBLICATIONS

United States Patent and Trademark Office, Notice of Allowance, U.S. Appl. No. 10/353,656, mailed May 19, 2005, 11 pages.
United States Patent and Trademark Office, Notice of Allowance, U.S. Appl. No. 10/353,656, mailed Feb. 24, 2006, 6 pages.
United States Patent and Trademark Office, Restriction Requirement, U.S. Appl. No. 11/511,053, mailed Nov. 14, 2008, 10 pages.
United States Patent and Trademark Office, Non-Final Office Action, U.S. Appl. No. 11/511,053, mailed Feb. 27, 2009, 8 pages.
United States Patent and Trademark Office, Notice of Allowance, U.S. Appl. No. 11/511,053, mailed Jun. 18, 2009, 4 pages.
United States Patent and Trademark Office, Office Action, U.S. Appl. No. 08/677,469, mailed Feb. 24, 1997, 12 pages.
United States Patent and Trademark Office, Notice of Allowance, U.S. Appl. No. 08/677,469, mailed Sep. 4, 1997, 4 pages.
United States Patent and Trademark Office, Office Action, U.S. Appl. No. 09/039,952, mailed Jan. 6, 1999, 12 pages.
United States Patent and Trademark Office, Office Action, U.S. Appl. No. 09/039,952, mailed Jul. 20, 1999, 6 pages.
United States Patent and Trademark Office, Notice of Allowance, U.S. Appl. No. 09/039,952, mailed Jan. 3, 2000, 2 pages.
United States Patent and Trademark Office, Notice of Allowance, U.S. Appl. No. 09/039,952, mailed Jan. 11, 2000, 3 pages.
United States Patent and Trademark Office, Final Office Action, U.S. Appl. No. 11/982,222, mailed Aug. 30, 2013, 14 pages.
United States Patent and Trademark Office, Non-Final Office Action, U.S. Appl. No. 13/196,867, mailed Sep. 16, 2013, 8 pages.
United States Patent and Trademark Office, Final Office Action, U.S. Appl. No. 11/982,054, mailed Oct. 16, 2013, 36 pages.
United States Patent and Trademark Office, Non-Final Office Action, U.S. Appl. No. 11/982,222, mailed May 16, 2013, 31 pages.
United States Patent and Trademark Office, Non-Final Office Action, U.S. Appl. No. 11/982,054, mailed May 24, 2013, 34 pages.

* cited by examiner

SYSTEM AND METHODOLOGY OF COORDINATED COLLABORATION AMONG USERS AND GROUPS

RELATED APPLICATIONS

This application is a Continuation of application Ser. No. 10/261,061 filed Sep. 30, 2002; which is a Continuation of application Ser. No. 09/492,218 now U.S. Pat. No. 7,157,638 filed Jan. 27, 2000; which is a Continuation of application Ser. No. 09/039,952 now U.S. Pat. No. 6,084,168 filed Mar. 16, 1998; which is a Continuation-in-part of application Ser. No. 08/677,469 now U.S. Pat. No. 5,728,960 filed Jul. 10, 1996.

FEDERALLY SPONSORED RESEARCH OR DEVELOPMENT

Not Applicable.

BACKGROUND OF THE INVENTION

The present invention relates to the field of music. More particularly, the present invention relates to a display system for displaying musical compositions, either batch or in a real time environment, and processing and communicating user performances.

Music is usually only available in the written form for one (or a fixed set of) performer/instrument types in a fixed key. Adaptations or variations of musical arrangements are complex and costly. Remotely located musicians are unable to effectively practice together. Small communities each with only a few musicians are limited to practicing with the few musicians they have.

Performers of music have many inconveniences to deal with. One such inconvenience deals with the composing, distribution, and utilization of music display presentation, traditionally sheet music. Another major problem relates to the inconvenience of scheduling and physical gathering of multiple musicians (including instrumentalists and vocalists), which when combined in their performance provide a musical ensemble or orchestra. For example, high school band practice requires that all students be available to practice at the same time at the same place (i.e., the school music room). However, this creates difficulties in that many students have other activities which conflict with band practice which is then incomplete. Additionally, when composing, musicians often will come up with an idea when physically not with another musician.

Musicians typically work from sheet music. When composing, they write the notes down on paper that has a number of staffs. If the musician transposes a composition from one key to another, the notes are also written down on the staff paper. The scores for different instruments must also be generated and written down. All of the scores are then copied for distribution to other musicians and/or music stores.

When performing, the sheet music must be found, for all parts to be played, manually distributed, manually set-up, manually handled (turn pages, etc.). There is also an unfulfilled need for quick access to a more comprehensive database of music for the performing musician, whether he is solo or part of an orchestra. Also, musicians often perform audience requests, and require access to sheet music for requested songs. Presently, there are various combinations of songs compiled in "FAKE" Books, usually by category (e.g., rock, country, blues, big band, etc.). This is only of limited help.

Furthermore, the use of paper sheet music is cumbersome and inconvenient; pages often get damaged or lost, and indexed access is poor and slow.

This method of composing and distributing music is inadequate when the music is used by a band or orchestra that requires hundreds of copies. If the conductor desires the piece to be played in a different key or certain sections of the music edited to suit the conductor's tastes, the composition must be rewritten and the new transposed copy distributed to the band or orchestra. This is a very costly, time-consuming, and laborious task if the orchestra has a large number of members.

Additionally, if the composition does not have a part for a certain instrument, the conductor must generate the required part from the original composition. After the score for the required instruments has been generated, the parts must be copied and distributed to the individual musicians. This, again, is a very costly and laborious task if the band has a large number of musicians requiring different parts. There is a need, therefore, for a more efficient way of transposing, editing, and distributing music scores.

Over the past many years, great advances have been made in the electronic input, storage, and display of music. Electronic bands and orchestras are constructed using computers and MIDI equipment. Programs exist for personal computers (e.g., Apple Macintosh, DOS, and Windows machines) for an individual to use the computer for transposing music, composing music. Programs also exists for automatically inputting music from direct performance (such as directly from a keyboard, electronically through MIDI converters (such as for string instruments), via pickups and microphones, and sequencers, tone generators, etc.) To generate digital data and/or music notation.

Musicians often perform both pre-planned and ad hoc compositions during the course of a performance. It would therefore be desirable to have the ability to access a large database of musical compositions on demand. It would also be desirable to permit communication and synchronization of a music presentation to multiple performing musicians who are playing together. It would also be desirable for a performing musician to have his or her performance of the music input onto an individual music workstation, and stored, and analyzed by an automated system, and/or communicated to one or more other networked (remote) individual music workstations.

SUMMARY OF THE INVENTION

The present invention encompasses a musical presentation system. In one embodiment, the system enables one or more users to select a musical composition, and perform the selected musical composition at each of a plurality of individual music stands, independently capturing the performance of a respective user and communicating the individuals performance data to a master workstation (which can be standalone or one of the networked individual workstations), which combines the plurality of individual workstation performance data into a composited combined performance data and communicates said combined performance data back to all of the individual workstations wherein the individual workstations provide for audio (and/or vide and/or audiovisual) output representative of the combined performance data (which represents the musical performance inputs for all of the communicating plurality of individual workstations). The time between the users performing the segment of music and that same user hearing the audio presentation of the combined data is less than the time interval detectable by a human being. In a preferred embodiment, the plurality of individual workstations collectively provide for synchronized display presentation of a selected music composition's presentation, and provide for output of individual performance data representative of the musical performance of the user corresponding to the display presentation. Timing-synchronization is also provided for to permit synchronization of the display presentation of the plurality of individual workstations, and for synchronization by the master workstation of the plurality of individual performance data to construct the combined performance data. In one embodiment, the master workstation generates a synchronization signal that is communicated to all the individual workstations from the master workstation. Other synchronization structures are also equally acceptable, such as embedding timing synchronization data within the individual performance data.

In another embodiment of the present invention, a musical presentation system enables a user to select from one or a variety of musical compositions, control the adaptation of the selected composition, and distribute the edited version efficiently in a paperless environment. The system and process of the present invention also provides means for receiving music from a number of sources. The user selects the desired musical composition from the source. The desired composition is displayed and/or stored in the system's memory for further processing by the system prior to display and/or distribution.

In accordance with one aspect of the present invention, each of the music workstations in an intelligent music composition communication architecture provides for musical information, to be distributed for a video or visual presentation of music in a user-friendly notation, and/or provides an audio presentation that can be selectively tracked and synched to the video presentation and/or tracks and synchs the displayed video presentation to a live performance, etc.

In still another embodiment, the system includes a user input device enabling selection of the musical composition, and optionally, permitting any user specified editing desired in the composition, and, in a preferred embodiment, permitting user selection of parameters (such as the musical key in which the composition is to be played). The user can then instruct the system to transmit the newly generated music scores to one or more display subsystems (such as CRT's, LED's, LCD's, etc.), or to other systems. In the preferred embodiment, these displays take the form of liquid crystal displays built into music stand based systems, also referred to herein as display stations or workstations.

This invention also relates to a musical presentation and/or communication system, and more particularly, to a system which permits musicians to view the score or other audiovisual or visual-only presentations of a musical composition, to permit the musician/user to perform the musical composition on the instrument of choice, as selected by the user, and in the key of choice, as selected by the user.

In accordance with one aspect of the present invention, one or more music workstations are provided, consisting of a video presentation means, such as a display screen (CRT, LCD, LED, Heads Up Display (HUD) etc.) in conjunction with a computer-based system which in one embodiment stores a database of songs and music which can be utilized by the musician/user of the system.

In accordance with yet another embodiment of the present invention, there are provided numerous music workstations, such that different or similar instruments can each select a respective portion of a song to be performed, such that all musicians performing the same musical piece are provided musical presentation or representation in the same key to permit the playing of the music together. In a preferred embodiment, the system is capable of locking into a particular key (and/or instrument type) responsive to input variables (such as can be provided via an input device such as a microphone or keyboard, or voice recognition, or camera) to determine the desired key to be played in. In a preferred embodiment, the user can select an auto-transpose mode where all music is thereafter automatically transposed. The transposition can take place at a master workstation and then be communicated to the individual workstations. In one of the illustrated embodiments, the transposition of the music takes place locally at the music workstation which provides local intelligence. An original musical composition, such as selected from a stored database of a library of music is then transposed in accordance with transposition rules. Many options are available, and various transposition rules and methods are well known and documented and in use on numerous products, such as keyboards which have built-in capabilities for transposition of music, as well as computer software which provides for transposition and notation of music.

In accordance with an alternate embodiment, the user connects to a remote database via wireless or wired communication to permit downloading to the local computer of those musical pieces which the user has selected for performance. The user music terminal, or the central computer, can receive the transposed (derivative composition) version or can receive an unmodified (original musical composition) version, which it can then display and/or convert and transpose music as necessary for each instrument and/or key.

In another alternate embodiment, a user can prearrange for downloading of selected compositions via a remote connection service, where the music user terminal can include a non-volatile storage memory permitting the storage and replay of all requested compositions. Alternatively, a central server can be provided, where multiple music end terminals share a single central controller computer, or each have their own computers which share in a central server computer or with each other in a distributed architecture.

Alternatively, a non-volatile storage structure, such as a CD-ROM, can contain a database of music which can be selected from for transposition in accordance with the present invention.

The present invention provides a music communication architecture and methodology that permits the synchronizing of music display presentations for multiple display stations performing the same musical composition. Bands and orchestras can be constructed using multiple independent music workstation display whether at one site or remotely distributed. In one embodiment, the music display presentations provides one or more of the display of the musical composition, performance by the user, and the output presentation for the combination of the individual performance data for a plurality of individual workstations. In one embodiment, a master workstation is responsive to the individual performance data from the plurality of individual performance data and provides means for synchronizing and compositing the individual performance data from the plurality of the individual workstations, and providing a presentation output (audio and/or video) comprising the combined virtual performance.

It is a further object of the present invention to permit the comparison of a performer's performance parameters, such as parameter signals obtained via a microphone and/or camera, of the performing artist's performance or execution as compared to the stored and displayed music. The comparison includes the pitch, timing, volume, and tempo etc. of the music (such as through audio recognition) and critique the artist's physical movements (e.g., proper finger position, etc.)

through visual recognition. In a preferred embodiment, the music workstation system provides the performer and/or a conductor with a presentation performance feedback indicating the quality of the performance as compared to the stored or displayed music, such as any errors, where they occurred, etc.

It is a further object of the present invention to provide a system whereby any displayed music can be transposed (e.g., to a different key, or converted to include different or additional different instruments and voices than that in which the sheet music is originally displayed).

It is a further object of the present invention to provide automated modes of intelligent operation of the music workstations, and to provide responsiveness to multiple forms of user input.

These and other aspects and attributes of the present invention will be discussed with reference to the following drawings and accompanying specification.

DETAILED DESCRIPTION OF THE PREFERRED EMBODIMENT

Figure 1A:
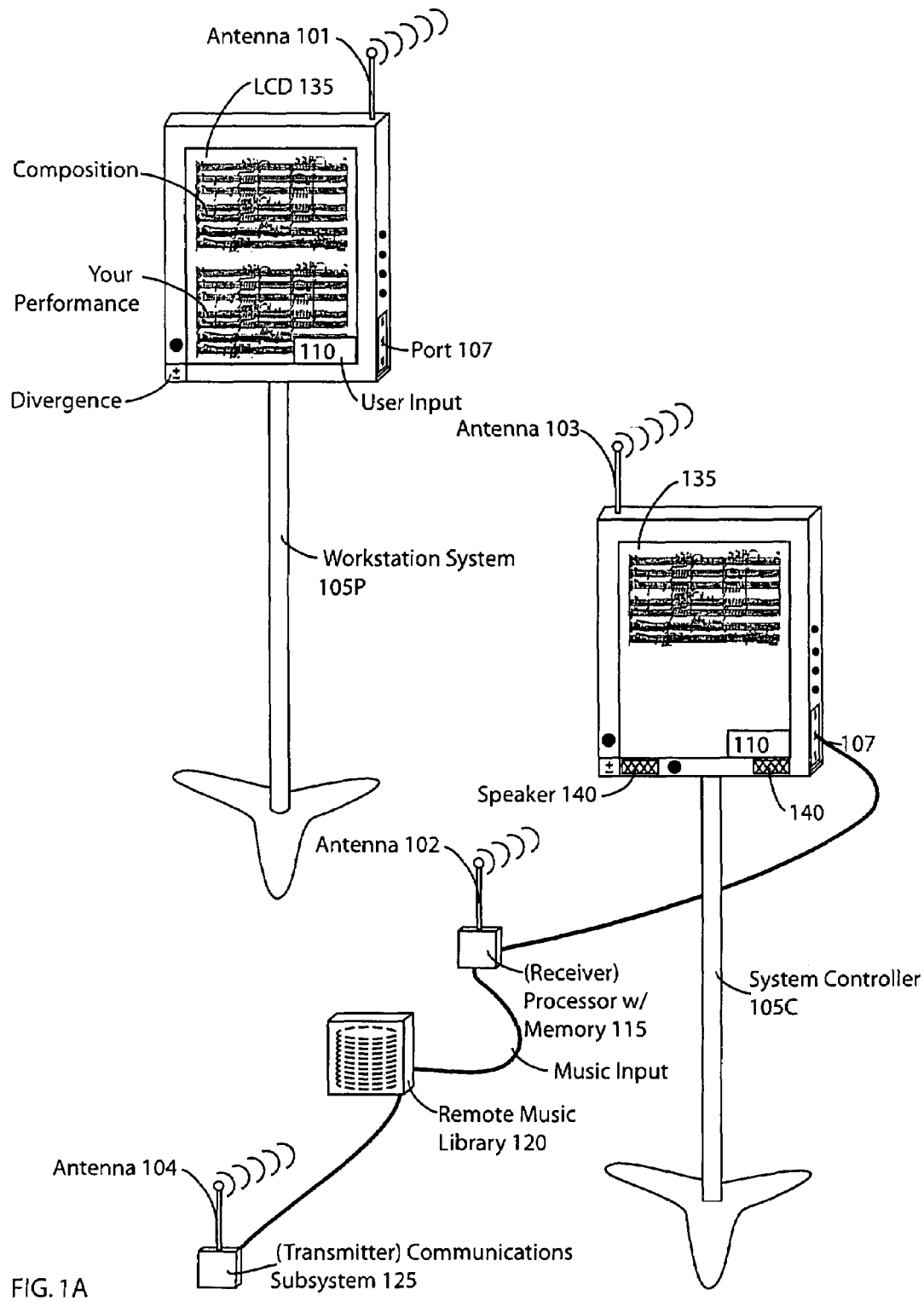
FIGS. 1A and 1B show a music presentation system in accordance with the present invention.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

In accordance with the teachings of the present invention, a system and methodology are provided for music presentation and communication. Musical compositions can be input to the present invention from any one or more of multiple sources, such as from prestored score images, live microphone, direct input from musical instruments or vocal direct performances, scanning in of existing printed score images (optically character recognized), cameras, visuals, etc. These inputs by the system are used in the selective storage, composition, communication, and presentation of the musical system of the present invention. The system can generate additional material automatically, or permit a user to modify, communicate, display and/or reproduce the musical compositions.

Modification can be performed on rhythm, primary key, individual notes, chords, etc. The vast store of musical information stored in digital notation format and/or any video format, can be broadcast (analog or digital) to a local music workstation or a master controller, which can also be a local workstation. The master controller can be a stand alone unit, or act as a server as well as its own stand alone unit, or simply as a server to a plurality of other stand alone units. However, in the minimal configuration, only a single musical user station is needed.

In one preferred embodiment, the workstation is provided as a music stand where the display presentation is a liquid crystal display (LCD). The LCD that can provide monochrome, gray scale or high quality color displays, depending on design and cost constraints and desires. Other display types can also be used. A touch-screen input can provide for simplified and adaptive user input selections. An optional built-in metronome function can also be provided for display presentation audio and/or video. A subsystem can also be optionally provided to permit the music to be audibly reproduced at the workstation through a speaker or headphone jack or other output.

It is well known in the art to convert user analog audio input into a digital format, ranging from straight Analog to Digital (e.g., A/D) conversion to processed data conversion to encoded digital music data, such as MIDI. Examples of MIDI include guitar input or other stringed instrument input through microphones or directly to MIDI-converters, or voice/non-pickup instruments through microphone converted to MIDI-input, or keyboard MIDI-input. Such input systems are commercially available from numerous companies for numerous types of interfaces at numerous interface levels. Similarly, numerous A/D converter subsystems are commercially available at chip and board solution levels (such as from Analog Devices Corporation and from Mattrox Systems).

In accordance with one aspect of the present invention, the multi-dimensional music transformation system of the present invention also enables a user to select one or more musical compositions from a larger database from a plurality of musical compositions. The database can be stored locally within the workstation, on site, or remotely stored and transmitted to the user (such as over cable, wire, telephone lines, wireless (such as radio frequencies)). The user can also optionally edit the selected score of the composition (such as changing the key and/or any note and/or timing, etc.) to suit his or her taste. The score (altered (the derivative composition) or not (the original composition)) can then be transmitted to one or more displays such as liquid crystal or CRTs in the music stands of the band or orchestra. The present invention, therefore, provides an efficient, paperless solution to communicating, presenting (displaying), and optionally one or more of transposing, editing, inputting, comparative testing-teaching, conducting, and disseminating music to one display or a large number of displays. Each display can have the same, or a different, unique, customized presentation of music notation as appropriate per selection, responsive to a set-up by a system, automatically per predefined parameters, and/or to user input. The score can also be printed out if a hard copy is desired.

As illustrated in FIG. 1, the music is stored, such as on a large hard drive or CD ROM jukebox, in a digital format as a music library (120). The music library (120) is coupled to a processor subsystem (115). Coupling can be wireless or cabled such as through a shielded cable, fiber optic conductor, switched connection (such as via phone lines), local, or remote. The processor (115) has the local storage capacity (e.g., semi- conductor memory, disk storage, etc.) to hold the digitized version of the music composition transmitted to it on request from the library (120). The music library can be local or proximately remote from the rest of the system.

In a wireless embodiment, the music library (120) is coupled to a communications subsystem (such as a radio frequency transmitter) (125) that transmits the contents of requested compositions from the remote music library (120) to the processor (115) through the antenna (104) of the transmitter. The antenna (102) at the receiver picks up the transmitted signal and the receiver conveys it to the processor (115). This embodiment enables the music library (120) to be remote and located at a great distance from the requesting site. The communications subsystem (125) can be a transceiver for bidirectional wireless communication, or a transmitter for one-way wireless communication (such as where the requests are otherwise communicated to the music library subsystem (120), such as via a wired connection).

As illustrated in FIG. 1A, a system controller, in the form of a music stand (105C) with a liquid crystal display, is used by an operator (e.g., performer, conductor, etc.) to select one or more musical compositions. FIG. 1A illustrates two types of music workstations stands. The workstation stand (105C) provides certain optional features for a more full-featured stand, including as illustrated, speakers (140) both wireless and wired communications capability, and as illustrated, shows the processor with memory (115) as an external separate component. The music stand (105P) shows the integration of the processor and memory into the music stand itself, and also shows both wireless (antenna (101)) and wired connection (port (107)) to permit network communication. Alternatively, the conductor stand (105C) could have all or part of the features integrated into the music stand (105C). Depending on the function for which the music workstation stand will be used, some or all of the features can be provided for that stand to minimize costs or optimize versatility. For example, in one situation, only the teacher or conductor needs the full-featured, full-powered music workstation. In that case, the performers or students do not have a full-feature workstation, but rather a scaled-down version of the workstation stand. In the preferred embodiment, a user input device (110) (such as a touch screen, microphone, keyboard, switches, voice recognition system, visual recognition system, etc.) is coupled to the processor in a wired (such as over a cable or fiber optic link) or wireless (such as over an RF link or infrared link) manner for workstation stand (105C), or directly to the processor, where it is built into the system controller as workstation (105P). The user can select an original musical composition from the touch screen of the liquid crystal display (135). The processor responds by storing that composition in the memory (115) of the local workstation of the user as requested.

Using the touch sensitive LCD (135), the user can now create a derivative musical composition. The touch sensitive LCD allows the user to enter the musical key in which the original composition will be played, edit any notes desired, and select the instruments and parts that will be playing the composition. The composition as originally composed, and the derivative or modified composition can be played back to the user over speakers (140) so that he or she may listen (e.g., such as to observe how the changes will sound) while optionally permitting simultaneous viewing of the score on the presentation visual display. Once the score has been designated (e.g., selected, edited, etc.) to the users (e.g., conductor's) taste, the appropriate portions (e.g., by musical instrument) of the scores can then be transmitted for (optional storage and) display to the respective associated individual music workstation stands of the band members.

In a preferred embodiment, each stand has an input device (110) that permits the user of the stand to select which instrument will be using the stand. (As discussed above, this input device can take the form of a touch sensitive screen or a number of buttons or switches or voice or audio recognition, etc.)

In the preferred embodiment, each individual music workstation stand (105) can be directly and/or remotely programmed to addressably receive (and optionally to locally convert) and display the music score that is intended for the respective instrument type (user type) that will be using (is associated with) the stand. As an example, the user of the stand (or a conductor) can input their selection of saxophone into the user input device (110) of the workstation stand (105C), to program that workstation stand (105C) only to receive the musical score for the saxophone (see FIG. 3). Then, the musical scores for all selected parts can be independently broadcast to all connected workstation stands, with each individual workstation stand individually distinguishing and accepting only its part. Alternatively, each workstation stand can be individually addressed for separate broadcast reception of its own respective selected part. Additionally, the user of the stand can program the user input to select a musical part of a selected musical composition (e.g., saxophone first chair) and receive only the musical score intended for that chair. This same procedure can be followed for other instruments within the band or orchestra. Alternatively, a single music composition can be broadcast to all workstations, where each workstation has local intelligence (processing and storage) to permit local conversion for display at each workstation for the selected instrument for each workstation.

For wireless communications, the individual music workstation stands (105) are comprised of receivers (or transceivers where bidirectional communication is desired) and antennas (101, 103) for receiving (or transceiving) the radio frequency information from (and to) the master workstation (such as for the conductor). The music stand also has a display (such as an LCD (135)) for displaying the musical score intended for that stand.

Figure 1B:
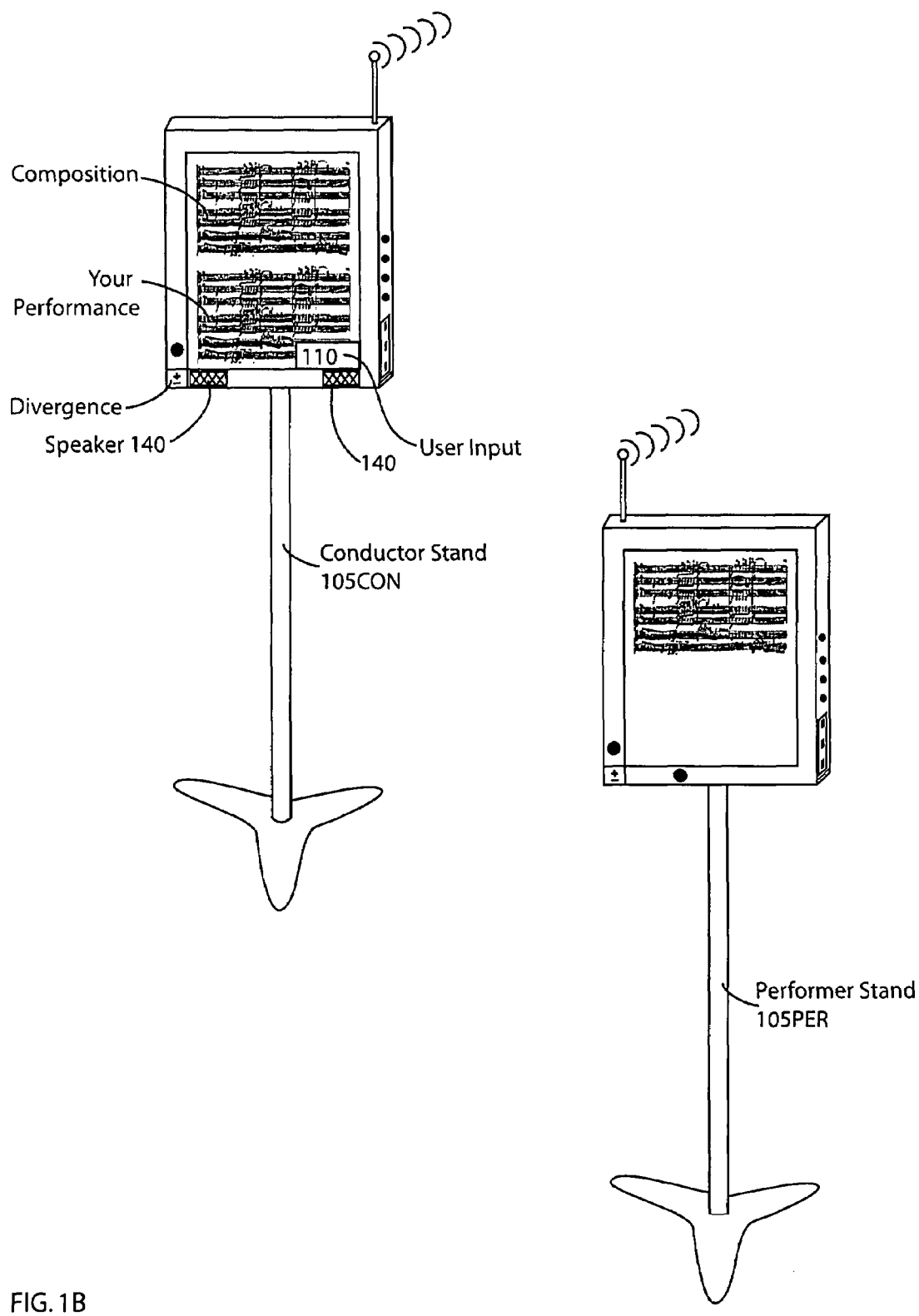

Referring to FIG. 1B, the music workstation stands can either be identical or broken down into conductor stands and performer stands. A conductor stand (105CON) may have more functions and control than a performer stand (10PER). A performer stand (10PER) might only have the ability to receive and display musical scores, whereas the conductor stand (105CON) has the ability to select the musical score, change the key of the musical composition, and perform other tasks only a conductor would be permitted or required to do.

In one embodiment, an RF antenna for the stand (105) can be built into the stand itself. Alternatively, instead of using RF, the performer's stand can be linked to the main (e.g., conductor's) stand using infrared, fiber optic cable, shielded cable, or other data transmission technologies. As discussed above, the communications link can be bidirectional, such as to facilitate requests and responses to facilitate the feedback of performance parameters or such that any workstation can be a master or slave, or used in combinations.

Figure 2A:
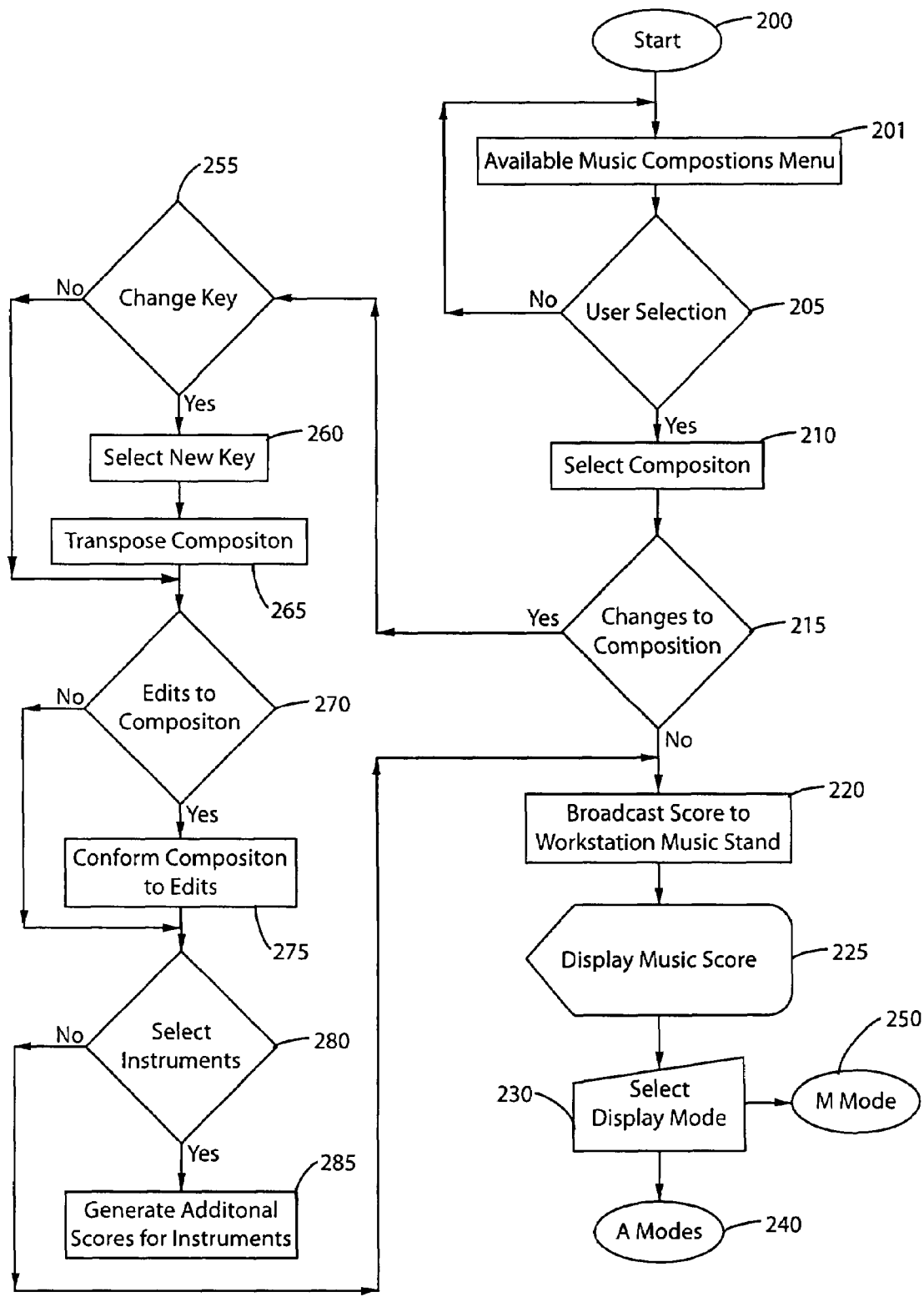
FIGS. 2A-2G show flow charts of the processes in accordance with the present invention.

FIG. 2A illustrates the overall operation of the music composition communication workstation. It begins by starting up the system (200). The system then provides a menu (201) that allows the user to select (205) a listing of available music compositions. The user then selects one or more compositions (210). If the user selects one from the menu that is locally stored, it directly retrieves the information. Alternatively, if it's not something locally stored, the system couples (e.g. will dial up or go through a database or network) to a remote storage site and requests and receives the selected compositions.

If there are desired changes to the composition (such as to the key (255), or note editing (270), or selection of form of display or instruments (280)), then those can be respectively accomplished as illustrated at blocks (260), (265), (275) and (285).

If no changes are desired, the musical score for the composition that is selected is broadcast, transmitted, or otherwise transferred to the workstation music stand (220). It is internally stored in the local workstation music stand. Next, the score is displayed (225) on the workstation display (e.g., LCD or CRT) or a video projection system. The display can also be part of an integral stand-alone workstation or an interconnected group of components including a personal computer (such as Macintosh, or DOS or Windows PC).

The display mode selection is then made (230). This permits selection of an operational display mode, not simply choosing the resolution or color. The two main choices in the preferred embodiment are a manual mode (250) and an automated mode (240). In the automated mode selection (240), there are many sub-modes or options, such as the operational mode that permits the performer or user to do their performing without having to tend to the selection of the portion of the music to be displayed or the turning of pages. In the auto performance mode, there is provided the simultaneous displaying of the selected musical composition, and a display representative of the audio performance of the user, and a divergence signal or divergence data representative of analyzing the performance, preferably in approximately real-time.

Figure 2B:
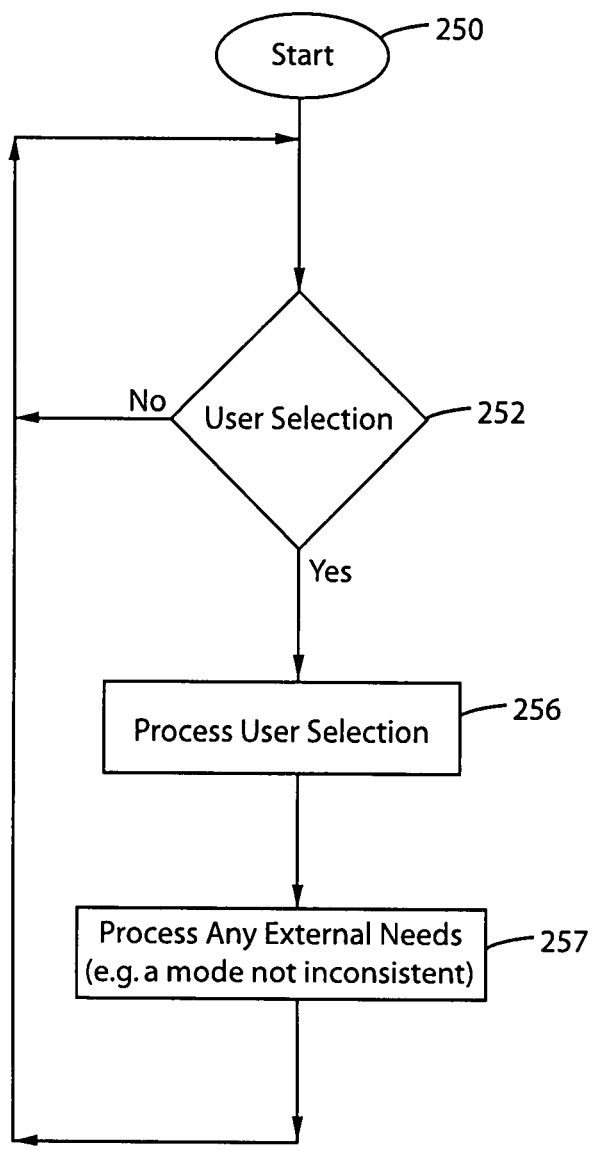

FIG. 2B illustrates the manual mode (250), which provides for user manual selection of functions (252). There are many functions that the user can select, even in the manual mode, such as hitting a button or a touch screen to cause the turning of the page of the display. Another function is to go back a page or to scroll forwards or backwards. For those who are vision impaired, another function can increase the font size of the music presentation.

Thus, there are many manually selected functions that can be provided. While the manual mode can have automated functions selected, it is distinguished from the automated mode where control is partially predefined without user assistance. In the manual mode (250), the user selects any and all features that are going to be provided (some of which can be automated). The selected function is then processed (256).

Next, any ongoing needs are processed (257). These needs can include any overlapping automated function (not otherwise inconsistent with any other selected function).

Figure 2C:
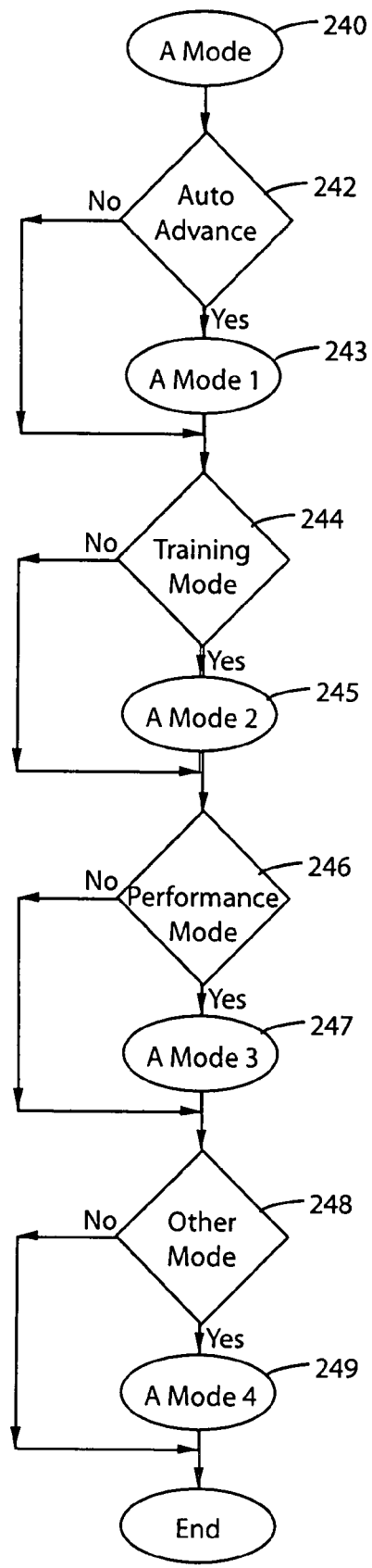

Referring to FIG. 2C, the operation of the automated mode "A Mode" (240) is illustrated. First, the user selection of the desired automatic mode is detected and responded to, illustrated as the auto-advance option (242), the training option (244), the performance option (246), or any one of a number of other options (248) as is described in further detail hereinafter. For example, auto repeat mode can be selected by designating the start and stop points, and the number of times to repeat a "looped" portion (or portions) of the displayed musical composition. Marching band mode (auto-advance based on metronome function, conductor control, etc), auto-compose mode, and many others can also be implemented. The order of selection of auto-advance, training, or performance mode is arbitrary, and the user can alternatively decide from a menu where all are simultaneously presented as choices.

The display can advance the music by page option, or by a user selection of one of many options (e.g., scrolling, tablature, video graphic tutorial display, etc.).

Figure 2D:
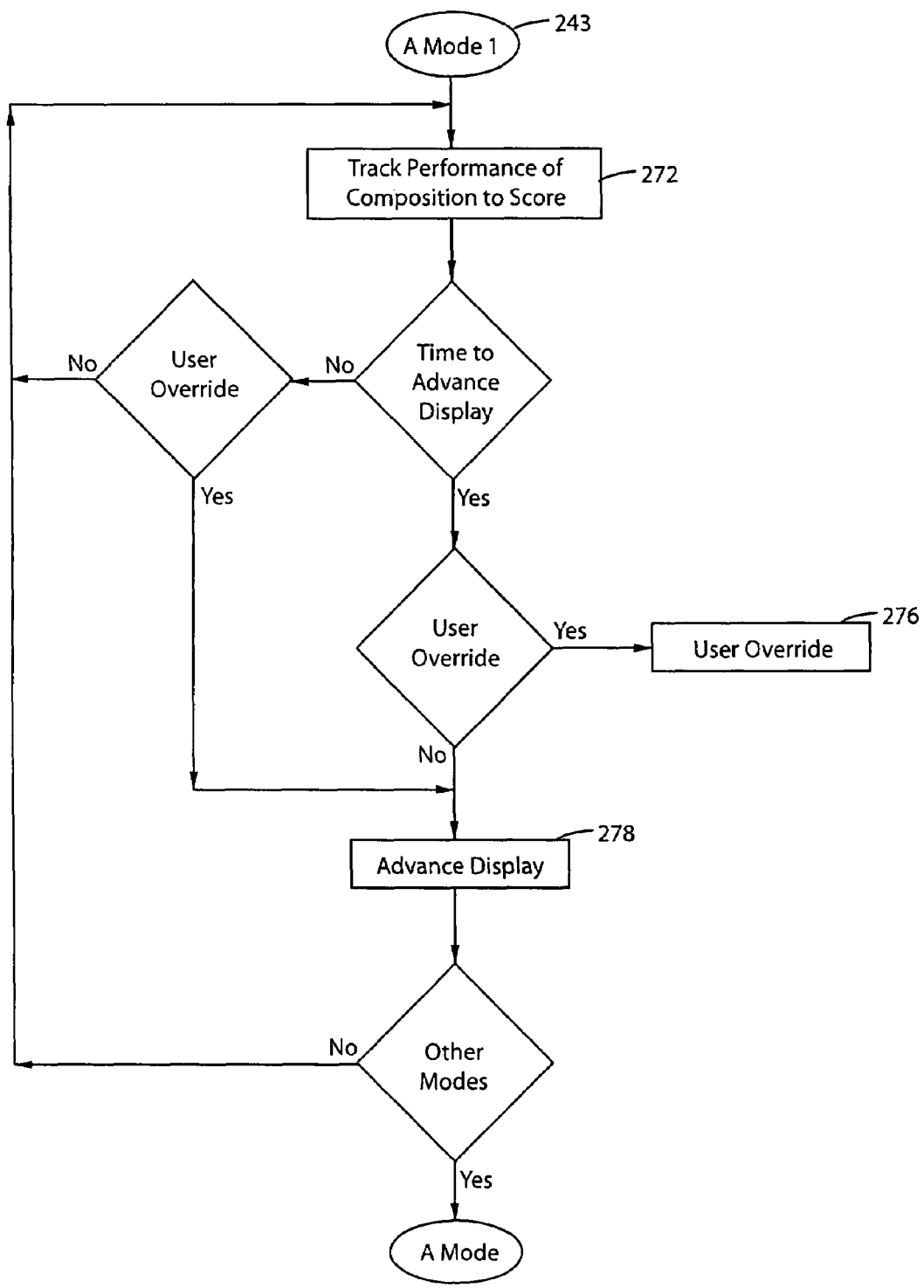

Referring to FIG. 2D, the automated mode 1 for auto-advance operation (242) of FIG. 2C is illustrated, where the user has selected an auto-advance performance mode. In this mode "A Mode 1" (243), the system tracks the performance by the user of the composition to the score (272). Performance refers to the actual performance by an individual person (or people) who is (are) reading the musical score upon which the performance is based. Whether that score is in tablature format, staff and clef and note notation, or some other format, the system generates appropriate signals to permit comparison of the user's performance to the musical score.

Based on a comparison, a decision is made pursuant to selection criteria programmed into the system (such as the rate at which the piece is being played, the time signature, the tempo, the rhythm, and the advancement of the music on the available display), the display presentation is advanced (278). In some cases, the music might move backwards, such as with D.S. Coda. The presentation of the display tracks the performance to permit smooth, uninterrupted playing or singing. The capability can be provided for the user to override this auto-advance, such as for practicing where it is desired to keep going back over sections. In this case, a user override option (276) is permitted to alter the automated operation. Upon cessation of user override, the system can be programmed to stop, to automatically return to the regular auto-advance mode, or to process other auto-modes (279) of FIG. 2C.

Figure 2E:
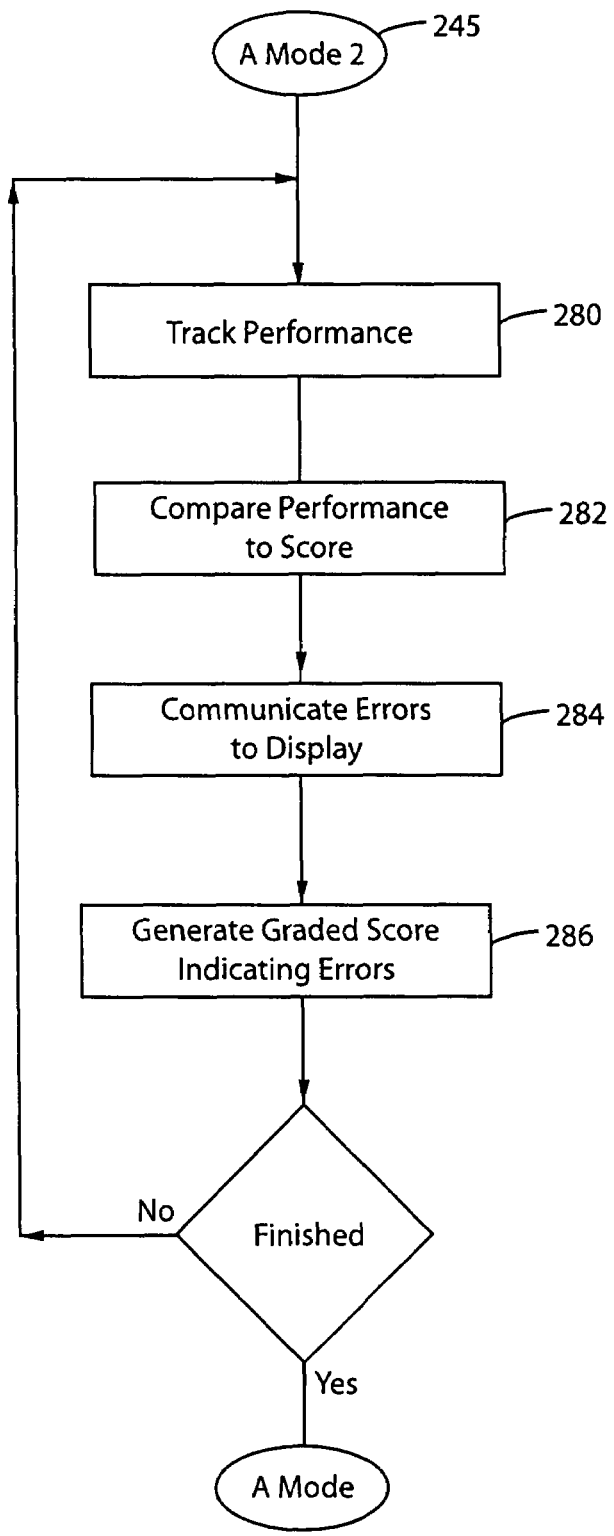

Referring to FIG. 2E, the automated mode "A Mode 2" (245) operation of FIG. 2C is illustrated corresponding to the training mode. In this mode, the system tracks the performance (280) of the individual user to the composition score, primarily for the purpose of permitting a critical analysis and comparison of the performance to the score (282). This analysis determines divergence from the selected musical score, and reveals errors or deviations from desired performance goals (e.g. match of timing of notes, duration of notes, pitch of notes, etc.), and to display those errors (284) (such as by audio or video means). Predefined performance goals provide the knowledge basis for expert system based analysis.

The system can then generate a graded score (286) indicating errors, and can present it in numerous formats such as histograms, frequency of errors, spacing of errors, etc. Identification of when the errors occur (e.g., only when going from slow to fast, or fast to slow), absolute position within the score and so forth, are also tracked and reported. Other expert system rules can be provided by music teachers which give the necessary parameters for modeling expert system reasoning, as well as guidance and suggestions on how to correct problems such as via display text, graphics, audio, etc.

The comparison of the performance to the score in the training mode is for the purpose of detecting the performer's compliance to parameters (such as the tempo, rhythm, filter, parameter, pitch, tonality, and other features that are adaptable or can be modified by performers). This parameter information is available and published in numerous forms. Thus, having provided this core set of parameters, the system can thereafter perform the training automated mode.

Figure 2F:
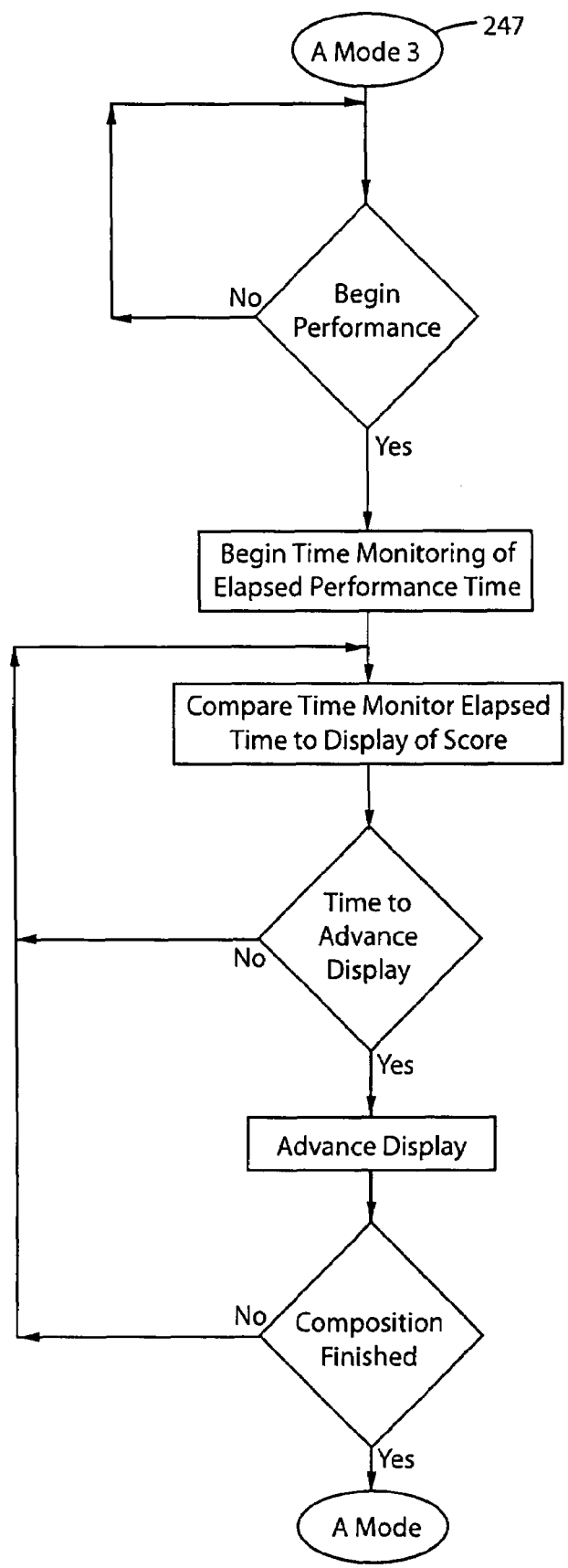

As illustrated in FIG. 2F, automated mode 3 "A Mode 3" is the performance mode (247) of FIG. 2C. In this mode, the operation is as in automated mode 1 (auto-advance mode)

except that no user override is permitted. Its primary purpose is to accompany the performer during the entire performance of a score as an automated page turner. The tracking of the "page turning" to the performance can optionally be based on inputs or criteria independent of a performer's actual performance input (e.g., microphone), such as a built-in metronome clock, a central control (e.g., a conductor or special user input), etc. Additionally, performance characteristics can be tracked, computed, and reported as in the teaching and training mode. Training feedback can optionally be provided real-time, or subsequent to completion of performance, to assist the performer as in the training mode. Alternatively, the score can be presented in a moving score mode (e.g., vertically, horizontally, or otherwise) or linear presentation as opposed to a real page turning display.

Figure 2G:
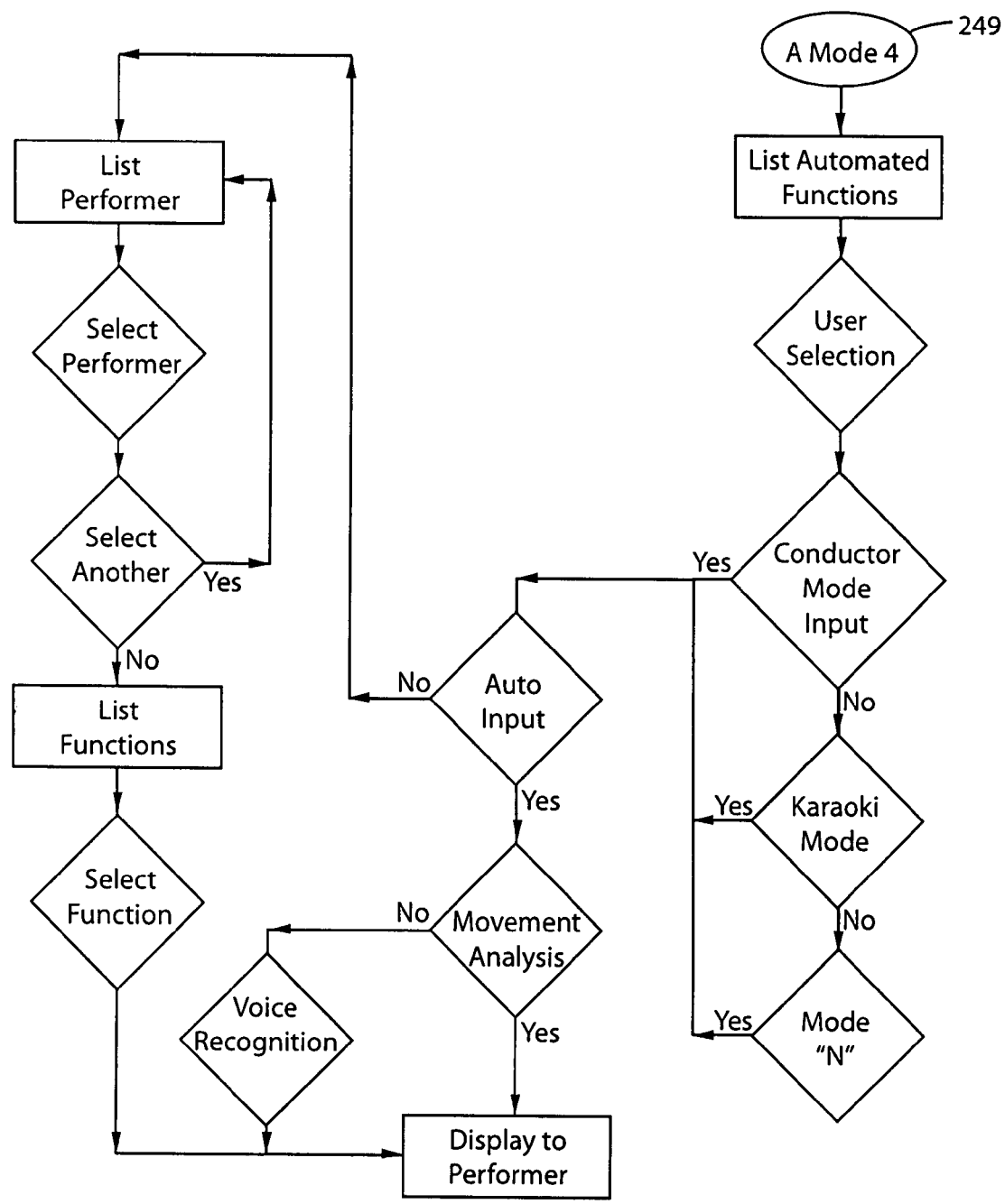

FIG. 2G shows the operation of automated mode 4 "A Mode 4" (249) of FIG. 2C which provides for the processing of other automated functions selected by the system. These modes can include conductor mode, karaoki mode, etc.

In conductor mode, a conductor can control communications of signals to his or her performer (such as "increase volume", or "increase tempo", or "play staccato"). Icons can be provided where the conductor simply touches a touch screen (or other input mechanisms) to supplement his hand and body motions to permit more effective communication with the performers. Alternatively, as illustrated in FIGS. 9 and 10, in a more advanced system version, the conductor's movements are first learned by a monitoring system, based on user definition and assignment of meanings for movement to provide an expert knowledge database.

Figure 9:
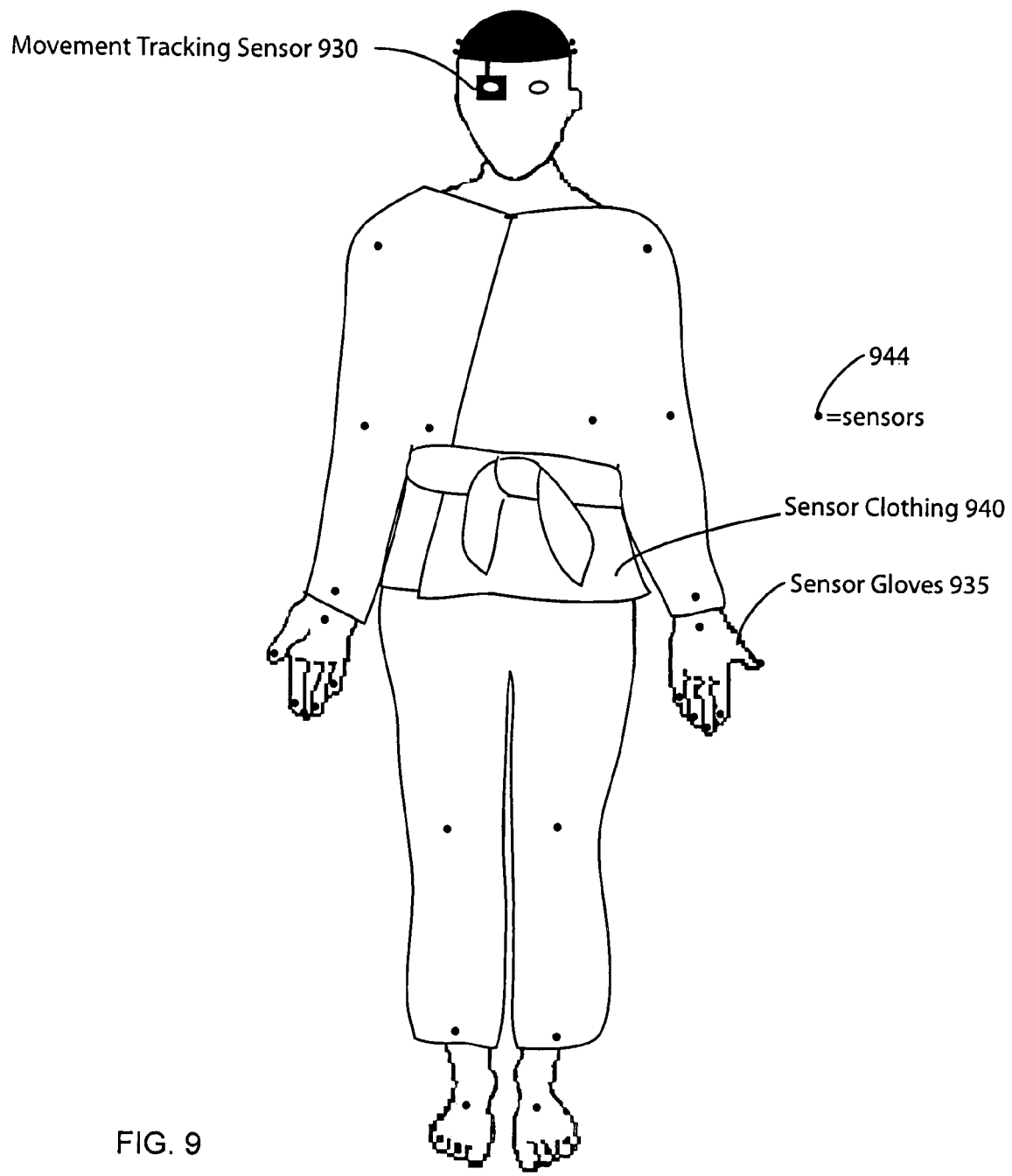
FIG. 9 shows a person outfitted with a sensor body suit in accordance with one aspect of the present invention.
Figure 10:
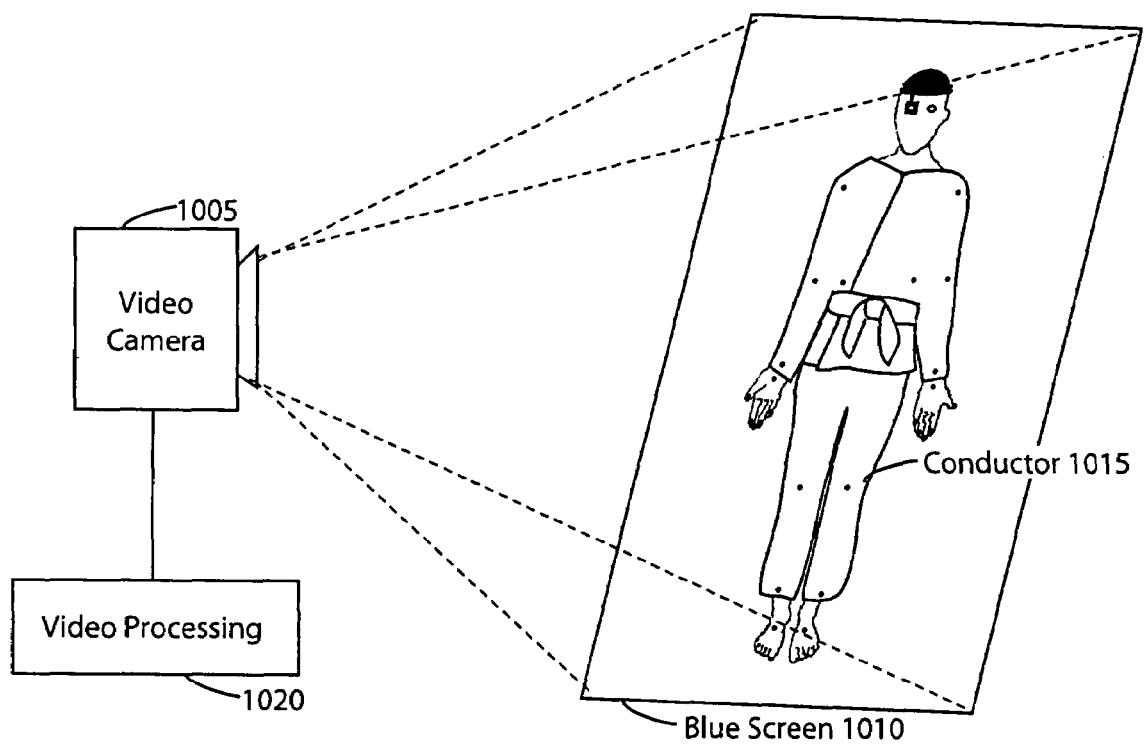
FIG. 10 shows a movement and pattern recognition system in accordance with one aspect of the present invention.

This system provides for tracking of movement input such as in FIG. 10 via video camera (1005) input of the conductor (1015) against a backdrop (e.g., blue screen) (1010) is processed by video processing unit (1020), or, as shown in FIG. 9, via body glove technology (gloves (935) or sensors (944) or sensor clothing (940) or head or eye movement tracking sensor (930) (such as used in virtual reality, flight simulation, avionics equipments (such as jets and space travel), and sports players for analyzing movement) to provide the necessary movement input. This movement input is analyzed utilizing the expert knowledge database to automatically generate a display (video and/or audio) to provide local visual and/or audio reinforcement on the local display (such as overlaying on a then unused portion of the music score display as a picture in a picture) to permit audio and video reinforcement of the conductor's body language. Thus, "a hush" body language signal that is directed towards a particular section of the orchestra would automatically be interpreted to cause the system to indicate, and only on that particular section's respective displays, a message (e.g., big face with a finger in front of it making a hush sound with a "hush" sound simultaneously output from a speaker). The conductor mode provides many benefits to performance and communication.

For all these automated modes (e.g., A Modes 1, 2, 3, 4), training feedback can be provided real time or subsequent to performance at either or both of the performer's workstation and a second (e.g., teacher's) workstation.

The advantages of electronic music composition, communication and display are many. In addition to those discussed elsewhere herein, a capability exists for expert system based artificial intelligent type assistance where the expert system assists in many of the functions performed in musical composition and performance. For example, in the Auto-Compose Mode, if the words need to be changed to match the meter, equivalent terms can be chosen from the many sources such as thesaurus, dictionaries, rhyming dictionaries, encyclopedias, etc., to assist as well. Phrases from poetry, selected and indexed by content or topic can be re-expressed to create new works. Drum and rhythm section accompaniment can be expertly suggested, as well as harmonies, melody lines to accompany chords, chord progressions to accompany melodies, harmonies to accompany a melody, and suggested musical instrument groupings to support a particular sound, rhythm, style, tonal quality, etc.

The expert system can be built from commercially available technology, including component hardware systems with supporting software, as well as commercially available software packages which operate on commodity-type personal and business computers such as the Macintosh by Apple Computer, Windows and DOS machines based on the X86 and Pentium processor technology of Intel, technology based on the Power PC and 68XXX processor by Motorola, DEC PDP-11 technology, Sun workstations, etc. Custom microcomputer or DSP based system architecture on a chip can also be constructed, as well as ASICs, custom or semi-custom logic.

The system can be designed to take advantage of expert system design knowledge. A database of rules and facts are provided, and accumulated over time by the system in a self-learn mode. The expert system itself has the necessary logic to probe the user, monitor the performance, and apply the rules to provide feedback and reports to the user of skill level, errors, automated performance display, etc., starting with a base defined set of rules, instructions, and a knowledge database specific to music.

The form of the musical score communication can be easily shaped to fit needs. One example is MIDI (Musical Instrument Digital Interface standard) which has advantages such as of bandwidth of storage used, is widely available commercially, is standardized, etc. However, signal processing, text, icon-based, object based, and various other forms of storage, user interface, and processing can also be applied to more specific applications of product.

Figure 3:
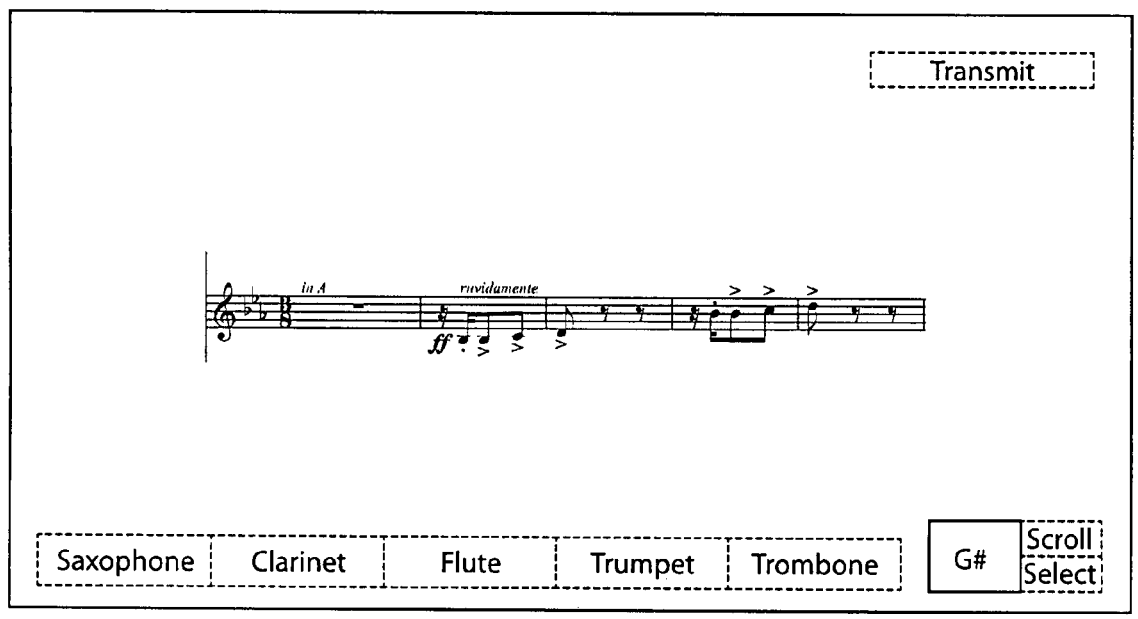
FIG. 3 shows one embodiment of the display for the music display workstations and input devices in accordance with the present invention.

FIG. 3 illustrates one embodiment of an LCD display used for input control and for displaying the information from the processor and memory. In the preferred embodiment, this LCD is a touch sensitive screen enabling the functions associated with each displayed button to change, and also for the displayed buttons to be moved around the screen, depending on the function to be activated. The musical score may be edited by the conductor, such as by touching the individual note after which he is presented with a number of notes to replace the touched note. The lower portion of the screen displays instruments from which the conductor can select which instrument will be playing the composition. After a button on this screen has been touched, a number of sub-screens may come up, each with their own individual touch sensitive areas and functions to be activated by those areas. Alternatively, in addition to or instead of the touch screen, the system can provide input via separate key switches, voice recognition, etc.

As an example, if the conductor touches the transmit key on the main screen, he will be presented with a screen showing all of the instruments that he has selected for that piece and a button labeled "ALL". He may now transmit to each individual music stand or by depressing the "ALL" area, transmit to the entire orchestra.

The music library can be contained ("stored") on non-volatile storage either locally or at a remote central site containing the entire (or a subset) database of all possible music (that is then downloaded to local storage on request, either real-time at performance time or in advance.)

Alternatively, the music library can be provided on storage medium that can be easily transported and used on site locally with the presentation system. Thus, for example, disk drives, cartridges, FLASH RAM cards, plug-in memory modules, or a CD-ROM or multiple CD-ROMs in a CD-ROM changer can be used to store and contain massive data libraries on musical compositions. While this would be a more expensive route than shared use of a central library, requiring each musical group to obtain libraries on all possible compositions they may want, it has the advantage of speed, flexibility, no need for communication with a separate remote source, and creates a whole new mass marketing area (such as for CDs or Digital Audio Tape (DATs)). Another way of utilizing this technology is to maintain a history of music used, either with the remote music library or local music library. This could be done for many reasons, including copyright royalty assessment, determining a history of musical performances and requests for future use in determining performance itineraries, etc. Alternatively, a hybrid of locally stored and centrally shared libraries can be utilized to optimize cost, speed and flexibility benefits.

In accordance with another aspect of the present invention, each display workstation can also provide the ability to convert performed musical compositions into annotated musical compositions, generating the appropriate musical notation (e.g., staff, tablature, MIDI), notes, time signature, key, instrument, or user type, etc.

Figure 4:
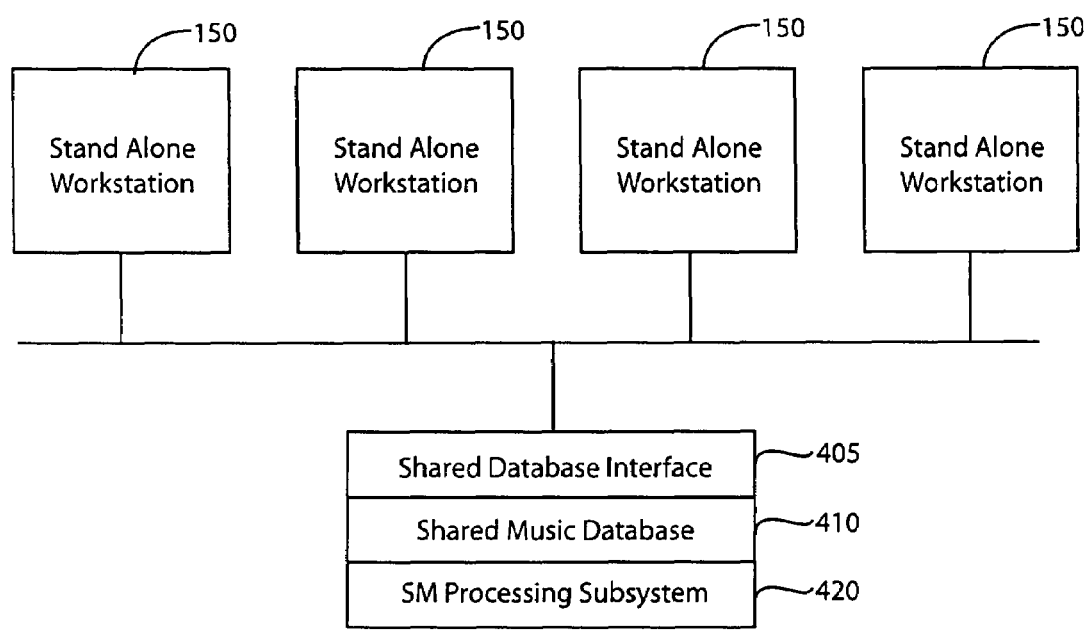
FIG. 4 shows a shared music database and stand alone workstation embodiment in accordance with the present invention.

The display workstation can be implemented as a totally self-contained workstation, where each workstation contains its own processing subsystem, optional communications interface (such as wireless or cable) for network use, input/output interface including one or more of a user input keypad, a speaker, a microphone, joysticks, push buttons, etc. Each of the stand alone workstations can then operate with a local database or couple to a shared music database as illustrated in FIG. 4.

The stand alone workstation(s) (105), are coupled to the shared database interface (405), and can either couple remotely (e.g., via phone lines) to the remote shared music database or to a local shared (410) or dedicated music database. The shared music database (410) can either be primarily a storage means (e.g., hard disk or CD-ROM), or can include a processing subsystem (420) for local intelligence. In one embodiment, the stand alone music workstation includes the shared music database (410) and interface (405), non-volatile local storage medium for the shared databases (410), and a local processing subsystem (420), and can operate completely stand-alone. In an alternate embodiment of this stand-alone device, the shared database interface is contained in the stand-alone workstation (but not the shared music database or processing subsystem), and provides capability for communication with a stored database (410) remote from the stand-alone device.

In either of these embodiments, an alternate additional embodiment provides capability for each stand-alone workstation to function as a master stand-alone, or a master or slave workstation within a workstation set including multiple stand-alone workstations, wherein one is designated master and the rest are designated slaves. The slave workstations in this configuration receive communication of music compositions to be displayed from the master workstation, thereby permitting one shared music database to be communicated among all workstations which are a part of the group. It is to be appreciated that the shared music database function can be distributed in many different ways among the workstations, or separable from and independent from the workstations. The choice is simply one of design, and the illustration herein should not be taken in a limiting manner.

In one embodiment, the master workstation has complete control over the slave workstation. Anything displayed on the master workstation is also displayed on the slave workstation. It is also possible for the user to mask certain portions of the display of the master workstation before it is displayed on the slave workstation. In this manner, the conductor, using the master workstation, can transmit to the slave workstations only that information that is required by the orchestra members.

In an alternate embodiment, the slave workstation communicates performance parameters or deviation signals to the master workstation, for error analysis feedback.

In accordance with another aspect of the present invention, means are provided wherein a plurality of individual workstations are coupled together in the network configuration to provide for networked communication of musical performance data wherein each of the individual music workstations provides for capturing the performance data for a users performance and communicating that performance data to a master or a conductor workstation which synchronizes and combines the plurality of individual workstations performance data to create a composite virtual performance data output which is recommunicated back to all of the individual workstations in approximately real time, so that the individual workstations can receive the composite virtual performance data and provide an audio output (and/or visual presentation) of the combined composite virtual performance data including all of the individual workstations users performances. While the networking can be used in conjunction with other features and embodiments of the present invention, including communication of musical compositions for display, and other musical performance data analysis and data communication, as well as inter-musician interpersonal communication, the networked embodiment of the present invention permits synchronized virtual performance thereby permitting multiple remotely located individual workstations to physically separately perform with the benefit of hearing in approximately real time the combined result of all the performances at the individual workstations with their own individual performance.

In accordance with another aspect of the present invention, means are provided to permit a user of the music workstation to accomplish a transposition of a musical composition in pitch, tempo, and otherwise. In a preferred embodiment, the lead voice or instrument can audibly indicate the key via the microphone input or via another type of input stimulus. The workstation can analyze the user input, determine the key, pitch and tempo for a musical composition being partially performed by the user, and adjust and transform the composition to be displayed in the new user desired key, pitch, tempo, etc., either solely for use on that workstation, or communication for use on one or more other workstations. In a networked version, this user input can also be communicated to other workstations for use by one or more of the workstations in transposing, or communicated to a master workstation, which transposes and rebroadcasts the transposed composition.

Alternatively, the user can input the pitch, tempo, and key via the user input (e.g. keypad, joystick, push buttons, voice recognition, playing of an instrument, etc.) and the system performs the transformation and displays (and/or prints out and/or audibly performs) the modified transformed composition for the user. Additionally, where a musical composition is written for one instrument and a different or additional instrument version is desired for simultaneous performance, the user can indicate the other instruments via the user input, and the system will generate the appropriate displays. The workstation can also provide an audio output of the transformed musical composition, either for the individual additional instrument or voice transform and present it, or for the composite of additional versions and the original version, to hear the blended piece.

Figure 5:
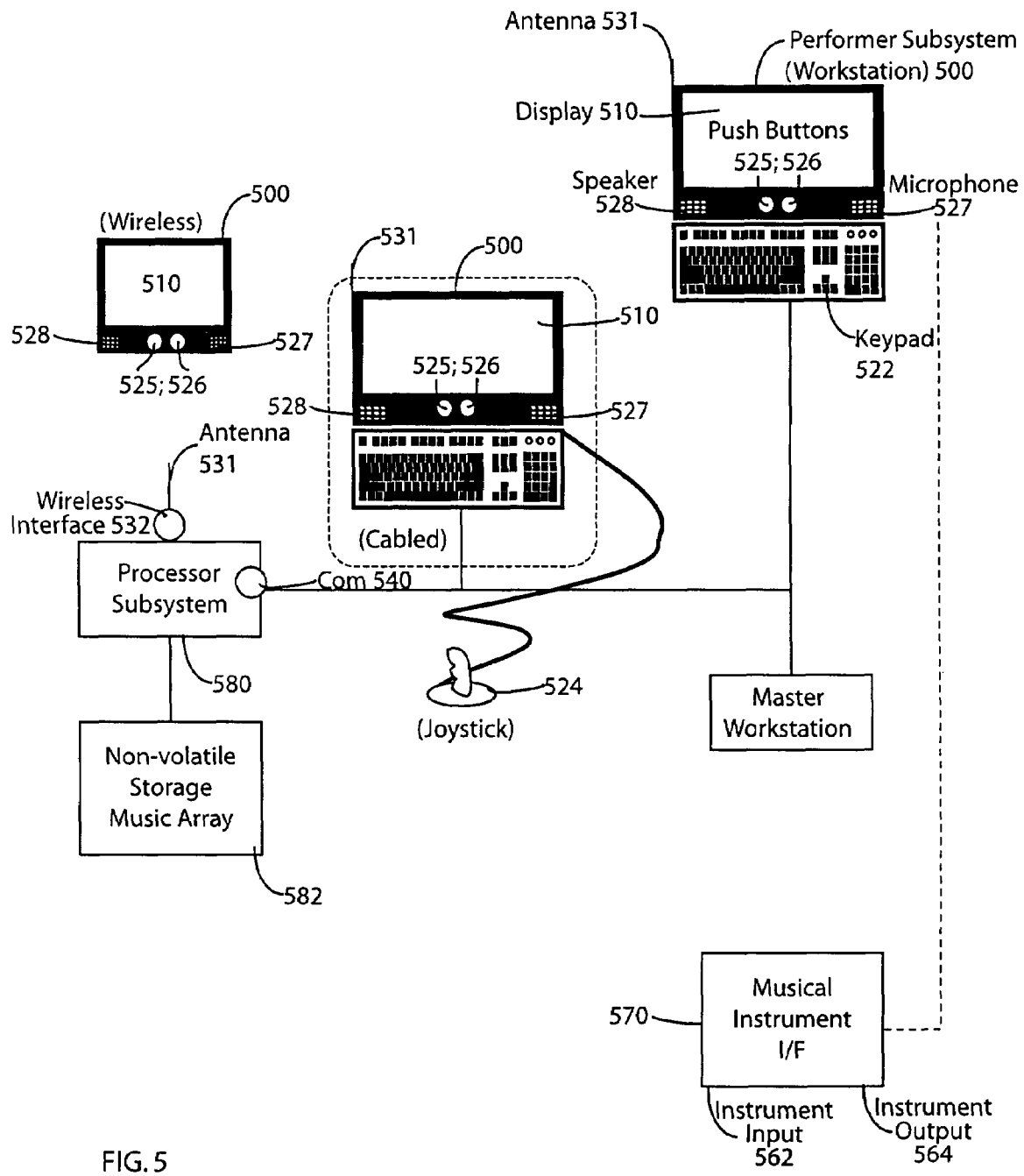
FIG. 5 shows a music communication system in accordance with the present invention.

Referring to FIG. 5, a music communication system is illustrated comprising multiple workstations (500) each comprising a display (510), user input such as a keypad (522), a joystick (524), push buttons (525 & 526), a microphone (527), and a speaker (528). The workstation also includes communication interface means such as a wireless interface (532) including an antenna (531), or alternatively or additionally a wired or cabled communication interface (540). Each workstation further includes a local microcomputer subsystem that provides local intelligence and management of functions in the workstation.

In the networked embodiment, where multiple physically separate locations each having one or more individual workstations provide for communication of performance data from the individual workstations and presentation by the individual workstations of the combined virtual performance data at the individual workstation, to provide for a virtual performance. In this case, the communications interface would utilize slightly different structure, such as a phone modem (analog modem), a cable modem, ISDN as between locations, etc.

Communications interfaces of various types are well known and commercially available. At the present time, they are available for purchase at the chip, board, or system level. In fact, many single chip microcomputers include communications interface capabilities, wired or wireless.

The workstation further includes an optional musical instrument input (562) and a musical instrument output (564) that permit the coupling of a musical instrument via a musical instrument interface (570) directly to the workstation. Thus, a keyboard, electric guitar through appropriate input, or a microphone input through the interface (570) permits instruments or voices to be directly input to the workstation for direct input independent of the microphone (527).

The instrument output permits coupling of the instrument input signal, either directly fed through or as modified by the workstation for output to the appropriate public address or amplification and presentation system or separate analysis system. The workstations are coupled either via wired or wireless communication to a processor subsystem (580) that includes a processor, non-volatile memory, read/write memory and an interface to a non-volatile storage medium (582).

The processor subsystem (580) includes an appropriate communications interface, such as a communications interface (540) for wired interface or (532) for wireless interface including antenna (533). The processor subsystem couples to a non-volatile storage medium (582) containing, among other things, application programs, transformation programs, and either a shared music library interface application program or the actual shared music library and access program.

Figure 6:
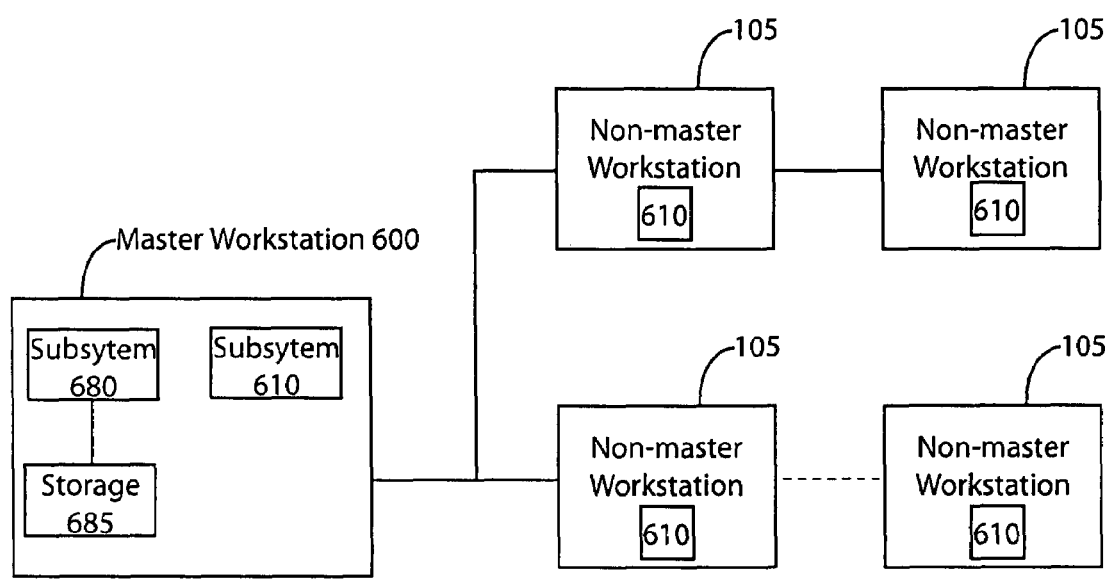
FIG. 6 shows a master workstation and slave workstations in accordance with the present invention.

As described above, the processor subsystem (580) and non-volatile storage (582) music library can be built directly into one of the music workstations (500) to be a master, with the other workstations being slaves, that can either include the processor subsystem and non-volatile storage or can be lower cost dummy slave terminals. As illustrated in FIG. 6, a first master workstation (600) provides a basic workstation subsystem (610) plus contains the processor subsystem (680) and non-volatile storage system (685) as a part thereof so as to provide a complete stand alone music communication system, and be capable of acting as a master or master/slave. This master workstation(s) (600) can function as a stand alone, or can couple to one or more other workstations, including one or more masters (600) and/or one or more non-master workstations (105).

The multiple connected workstations can operate as stand alone workstations using their local intelligence for displaying downloaded or resident music compositions. They can also interact in a master/slave linked environment, where one of the master workstations (600) asserts a master status, and all other interconnected workstations, whether workstations (105) or master/slave workstations (600) operate in a slave mode coupled to independent on the designated master. Additionally, masters can communicate between each other for a master/master network configuration.

Alternatively, the multiple connected workstations can operate together in a networked virtual performance mode, or in a networked communications mode. A dedicated stand alone or distributed master workstation architecture can provide for the coordination and combination and synchronization of the multiple individual performance data outputs into a combined virtual performance data output.

Figure 7:
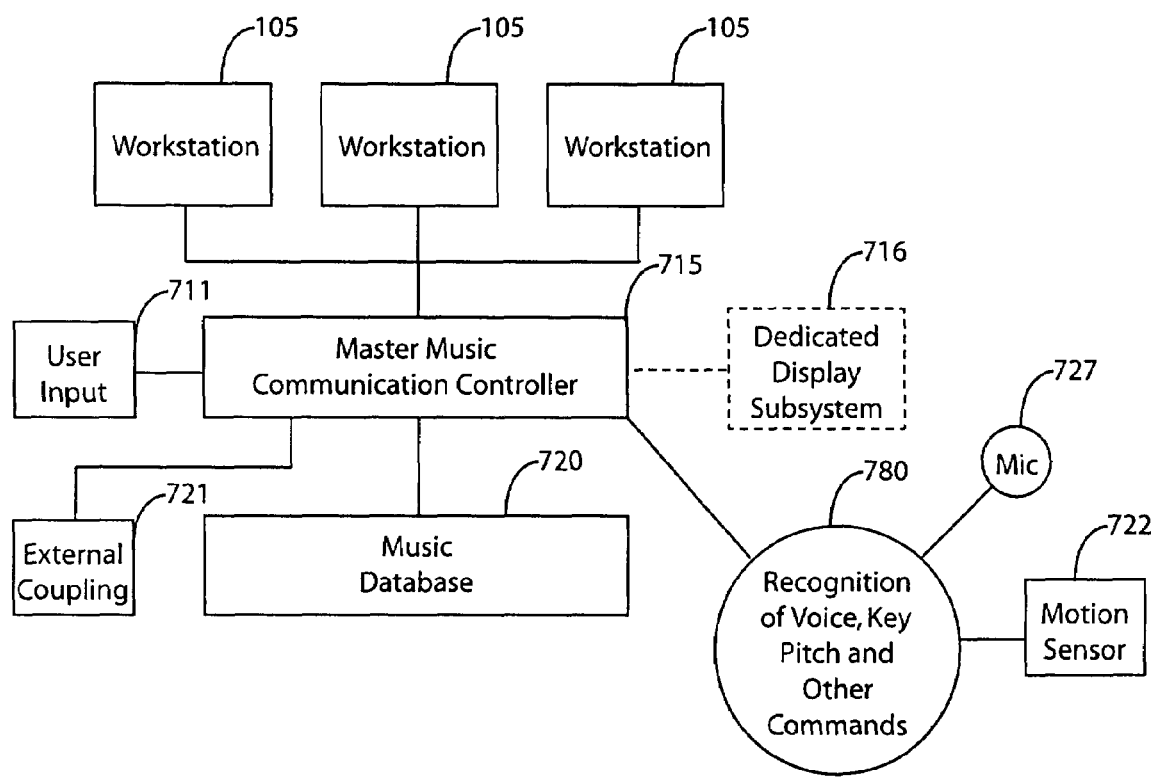
FIG. 7 shows an alternate embodiment of the present invention using one or more of the workstations coupled to a master controller and music database.

Referring to FIG. 7, an alternate embodiment of the present invention is provided where one or more workstations (105) include, at a minimum, a display of the music notation. These workstations are coupled to a master music communications controller (715) that provides for a separate user input (711) which provides input interface, such as to a MIDI status stream, computer data links (such as RS232, modem data link) etc. that designate requested musical compositions, transformations, and display requests for various ones of the coupled workstations.

In an alternative embodiment, the master music communications controller (715) provides for additional functionality including virtual performance mode, wherein the input interface (such as the MIDI stream, computer data links, etc.) provide one or more of musical compositions data for display, transformation information, display requests, user individual performance data, and wherein the workstations respond to the master music communications controller to couple their individual performance data and receive back the combined virtual performance data.

The workstations (105) access the music database storage means (720) that provides the data for the requested music composition via the master controller (715). The master controller (715) displays both the requested music composition as well as user interface communication for the music communication system to be displayed on either a dedicated display (716) or on one of the workstations (105) as designated by the master controller (715). The music database (720) can either be local, or can be via a data link (e.g., phone line, RF, otherwise). In one embodiment, a motion sensor subsystem (722) monitors motion of a target person and responds in accordance with predefined movement interpretation characteristics parameters, such as for a conductor.

In a preferred embodiment, the user input means (711) is comprised of a key switch device, such as a touch membrane keypad or capacitance touch surface. Alternatively, in one preferred embodiment, the user input is provided via a touch screen technology. Touch screen technology permits the display of user interactive icons and legends including text and graphics making possible unlimited customization of user input structure according to task needs. Thus, specific switches or sequences of touches to the touch screen can be associated with common use icons from the task being performed in conjunction with words to provide ultimate clarity.

User error is virtually eliminated, with the aid of automatic entry error detection, such as defined fields, mandatory fields, etc.

Alternatively, the microphone input (727) can provide for coupling of user speech to a processor subsystem (780) that uses any of a number of commercially available and well known speech recognition algorithms. These algorithms provide for speech recognition input control, either solely or as a supplement to touch screen or other tactile input mechanisms.

In a deluxe embodiment, an output (721) is provided that permits coupling of an external display, such as a color monitor, projection unit, or other display presentation system including one or more of audio, visual, and audiovisual.

Additionally, the display presentation output of the workstation can provide for an audio output presentation of the musical performance, either generated by the work station responsive to the music composition data, to the users performance, to the combined virtual performance data, or responsive to an external source. Additionally, a visual or audio visual presentation can be provided to provide information feedback to the user on both their individual performance as well as from and between individual workstations and/or the master controller or conductor workstation.

In accordance with another aspect of the present invention, means are provided for moving through the printed (displayed) notation of the music in synchronization with the live performance from the displayed musical notation.

Musical notation is used, in the generic sense, to refer to any way of conveying musical performance instructions including but not limited to common musical notation with staffs, notes, sharps, flats, and clefs, extending to written instructions in text form to supplement this or supplant or partially replace, as well as alternate forms of expression such as chord charts, words and chords (letters), tablature, any video, graphic, audio, audiovisual or other display presentation or combination of the aforementioned types of presentations.

An annoyance in performing music using any written notation (whether on paper or displayed on a presentation apparatus such as a screen) is smoothly performing music and timing "flips of pages" (or the communication of change to a third party, such as touching a key or button). This is especially true when the user is marching and both hands are required simultaneously.

In accordance with one aspect of the present invention, means are provided to accept inputs from one or more sources that initiates a "page turn". Types of inputs include conventional touch input apparatus (such as key switches or capacitive touch pads), motion sensing gear, and automatically when operating in the operational mode of Auto Mode. The motion sensing gear can be for a portion of the performer's body, such as a head tilt sensor or an optical eye movement sensor, etc.

Additional types of inputs that can initiate a "page turn" include voice or sound recognition apparatus built into the microcontroller system. This apparatus has the ability to use pattern recognition specific to the sound or user voice and words being said (for extremely high accuracy). Of course, any type of user actuated device such as a foot or hand switch, or head motion device, or sound or voice recognition system, in a preferred embodiment, is selectively permitted to control the override of the normal progression of the music's play.

The override may cause the progression to go backwards or forwards in the music score irrespective of the normal reading of it. The performance mode AutoMode blocks the user override to permit performance according to proper material timing and either progresses responsive to the music composition data timing, or in an optional embodiment, to the performer. This automatically moves through the musical score as written and preferably shows an indication of metronome time and an indication of the proper place in the score where the performer should be for that instrument at any specific time. This is especially valuable in a conductor mode of networked communication, where a conductor couples to one or more music workstations.

The user's performance can be compared to the score, and feedback can be provided to the performer as to the quality of their performance.

In the performance monitor mode, for a single user or multiple users, the user (or a remote teacher or conductor) can indicate the rate at which he feels the performer should be performing. A microphone input on the music workstation samples the user's actual performance and permits providing a graphical mapping (for the user or teacher/conductor) showing the relative synchronization of the performer's actual performance versus the conductor's desired performance.

In an alternate automatic advanced mode, the display of the music composition is synchronized to the performers actual performance. Thus, rather than simply indicating visually for the teacher/conductor or user what their relative performance was to the written displayed musical composition, the relative performer to written music synchronization information can be utilized to adjust the display rate of the actual musical composition to match that of the performer.

With use of appropriate sound baffling, a plurality of instruments can simultaneously be monitored and controlled by the conductor, so long as each instrument's output sound pattern is communicated directly to a respective workstation. The output of each of the workstations can then be coupled to the conductor's master workstation for further analysis and processing.

A workstation for an oboe may have a built in slide boom with a featherweight microphone to be able to receive sound input from the oboe. Electric instruments, such as guitars, keyboards, and other electrical analog signal sources can be fed directly to a line input that is appropriately buffered and filtered. Signal input can also be accommodated through a MIDI-interface subsystem that permits both utilization of data in workstation to workstation communications and utilization of MIDI-output at the station where the data was input.

For networked virtual performance, and for one aspect of output display presentation, the utilization of MIDI input and MIDI output, at each of the individual workstations and at the master controller workstation, permits the capture of the user performance and conversion to individual performance data which includes time synchronization information which can be communicated to the master workstation, which synchronizes and combines the individual performance data to generate combined virtual performance data which is then communicated back to the individual workstations which utilizing their MIDI output interfaces provide for display presentation (e.g. audio output) of the combined virtual performance data. Additionally, even where virtual performance mode is not selected, the provision of MIDI interface input and output on the workstations have other multiple beneficial users as discussed elsewhere herein. Additionally, other types of user performance to user performance data input devices and transducers can be utilized, as are well known commercially available including variations of analog digital converter input devices, audio signal capture, etc.

By combining the conductor and performance mode operations, the workstation can be enhanced to provide training and comparison of performance to actual music.

Some music is only available in annotated forms where there is not an existing signal showing proper synchronization of the signals. Thus, a controller subsystem (such as (780)) provides for real time conversion and analysis of syntax of the music notation, in conjunction with a precision clock metronome, and provides an indicator (such as color or other highlighting or bolding or accentuating) of the relative timing of the performance relative to a place in the sheet music (or other form of musical notation).

Existing forms of music notation can be converted manually, or can be converted automatically by scanning in sheet music, recognizing (using optical character recognition) the various elements of the music, and facets and specifics of the syntax in the form of notation including its constants and variables and protocols, and integrating via an artificial intelligence type expert system that notates, highlights, and accentuates via synchronized metronoming of time signature to music. Any of a variety of other means of converting music can also be used, such as direct input of musical performance signals processed via software that converts it into musical notation. Such software is commercially available, such as from ARS NOVA, Wildcat Canyon Software, Mark of the Unicorn, Inc., and Passport Designs, Inc.

Since the music notation is now in computer usable form, it is now an easy task to communicate, display, compose, alter, and transpose music (such as in key, for types of instruments or voice parts, and harmonies) via well known techniques.

Additionally, where the user input is converted into user performance data for the workstation, the users individual performance data is also now in computer usable form and if appropriately converted from performance to performance data, includes appropriate synchronization data relative to master controller performance synchronization signal. Thus, both the music notation is in computer usable form (making it easy to display, alter and analyze/compare), and the users performance is in computer usable form (digital individual performance data), it is possible to provide intelligent operation and analysis and utilization of both the music composition information and the user performance information, to provide for various automated modes and features to the users Implementation can also be in a custom design comprised of a microprocessor, non-volatile storage memory, read/write memory, and whatever additional peripheral circuitry is needed (such as are available in ASICs, or single chip microcomputer chip sets including CPUs, DSPs, A/D, and other peripheral support circuitry). These single or multiple chip solutions can be utilized to create a dedicated system to perform complete music workstations performance criteria to support an extremely low cost, high volume music workstation solution.

A new form of communication is created in that both the process of communicating via standard notation is respected and adhered to, while at the same time permitting interaction and communication of music media signals ranging from simple analog, digitized (analog to digital converted), individual performance data (representative of the user's performance), and can optionally include timing/synchronization data.

A multi CD ROM changer accommodates indexed storage of hundreds of thousands to millions of musical compositions to permit complete stand alone operation of the user music workstation. Alternatively, an optional built-in or external modem can be provided to permit intercommunication with a remote central music database management system that permits both communication and down loading (and disconnect) for stand alone operation. Thus the workstation can stay on-line, pulling up music as needed, or can request a single or multiple pieces of musical works be provided to it, that are then downloaded from the central database manager. The user workstation then disconnects from the music database management system, and thereafter operates stand alone where all desired music is stored locally in storage (preferably non-volatile). Storage can be semiconductor, magnetic, optical or any other medium.

The use of virtual reality technology, including motion sensors and body gloves, permits monitoring of various other things (as shown in FIG. 9). For example, as shown in FIG. 10, a camera in conjunction with analysis logic, such as expert software, can monitor motion of role model behavior and compare performer behavior. Hand, finger, arm, leg, eye, head, body, and mouth movements can all be monitored and constructive critical feedback can be accumulated, analyzed, and fed back to the user or teacher, for performer training, or performances, or for conductor communication.

The input of monitored movement data is provided to the user workstation, permitting precise mechanics training such as finger position, the angle of striking of strings relative to the neck of a violin or guitar, or they can be used to permit the virtual performance of music by a performer using a virtual link apparatus such as a virtual reality glove and head movement detection apparatus. The user can then perform a piece with their own personalization without any musical instrument in fact.

For example, the guitar portion for a piece of music could be displayed in notation form and actually performed according to the timing of movements of the user's fingers (either actual fret positions, or only timing information). To add further reality, a mock guitar, keyboard, flute, or other instrument can be used and combined with virtual effects to provide for music performance and personalization. Thus, for entertainment purposes, users could perform as part of a symphony orchestra playing a violin portion. If they performed out of time, they would hear their instrument's performance out of synch with the rest of the orchestra's performance.

There are numerous ways to embody the conductor movement interpretation system. As illustrated in FIGS. 9 and 10, one is utilizing the body movement detection apparatus prevalent in virtual reality, sports medicine, etc., as discussed above, to identify specific movement patterns or signal parameters associated with certain movement patterns, to initiate a display presentation, audio, video, or audiovisual to provide a presentation associated with movement of the conductor. Alternatively, other techniques can be used such as taking the video feed from a video camera or other video source (e.g. VCR) and having the conductor interpret his movements and assign them unique meanings, to create a lexicon of his movements and corresponding meaning.

For example, rapid downward movements of the hand from up to down, in a certain manner, indicate "decrease the volume." When he points at a particular section at the same time as he is doing that, he is indicating that only that orchestra section is to reduce volume. In this manner, either camera input of movements, glove sensing of movements, or other techniques (such as audio, ultrasonic, etc.) can be used to track movement to permit associated meanings to be attached or indexed to particular signal parameters or parametric signals of the meaning of the movement parameters as provided by the conductor input device. For example, in the case of the virtual reality glove, that input would be the signal output of the glove as interpreted by associated software in a processor (such as a PC or a MAC). Alternatively, for example, in the case of video camera input, it could be pattern recognition or analog signal comparison to determine the presence of certain signal patterns indicating to the system to initiate automatic communication of a conductor presentation. In so doing, the conductor is able to rapidly convey his meaning, focus it to a particular group of instruments, and be done with it. He doesn't have to focus very long or concentrate to make sure they've gotten his signal. Instead he can focus on listening to see if they got his message.

Figure 8:
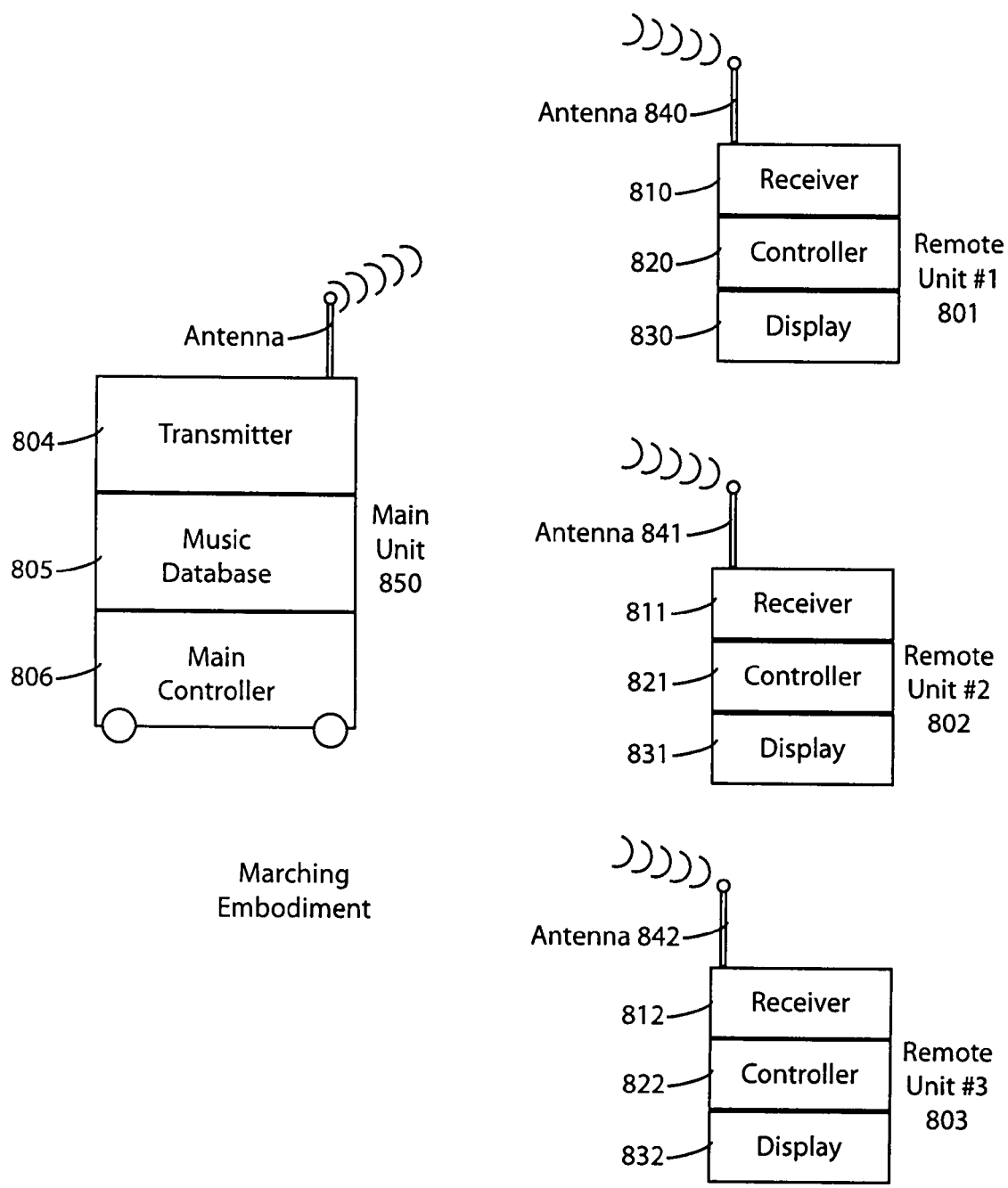
FIG. 8 shows a marching band environment in accordance with the present invention.

FIG. 8 illustrates an alternate embodiment of the present invention. In this embodiment, the workstations are remote units (801-803) used by a member of a marching band. Each of the remote units (801-803) are equipped with receivers (810-812) that receive musical compositions transmitted to them. Remote units controllers (820-822) control the operation of the remote unit (801-803). The musical composition is displayed on the remote unit's displays (830-832) which displays can be an LCD multiple line display providing low cost, low power usage, and high visibility/readability, and with Auto Advance Mode, the display automatically scrolls as the music is to be performed.

Each remote unit (801-803) can be mounted on the instrument on or in place of the lyre. The remote unit's antenna (840-842) can be separate from or built into the remote unit or the lyre.

A transportable main unit (850) is used to transmit musical compositions to the remote units (801-803). The transportable main unit (850) is comprised of a controller (806) for controlling the transportable main unit (850), a music database storage medium (805) containing the data for the musical compositions to be played by the band, and a transmitter (804) for transmitting the musical compositions to the remote units (801-803). This main unit can be in the form of a suitcase or briefcase size item. The main unit can also be provided built into a van that is driven around with the band or as a small self-contained portable unit. In accordance with this embodiment, the band can play a virtually unlimited number of musical compositions without the problem of carrying the music with them in paper form. It also relieves the band members of the problems of changing music and changing pages while marching. As discussed in the above embodiments, in the performance mode, the musical score is automatically scrolled across the screen display (830-832). Additionally, a keyboard and/or microphone can be attached to the transportable main unit allowing the conductor to send messages to the remote units via displays (830-832) or via a speaker associated with units (801-803). This allows the conductor to send instructions to the band (such as to take a certain route, or play at different volumes or speeds). With bidirectional communications and user performance feedback, the conductor can also monitor for errors.

FIG. 9 illustrates a conductor, stage hand, or other person with a sensor glove on each hand (935) and a head and eye movement monitor (930). The figure also illustrates the conductor wearing full body sensor equipment (940). Either embodiment or a combined embodiment can be used to map body movements. If only the gloves (935) or body sensors (944) are used, the movement of the glove or sensors can be captured by a video system, as illustrated in FIG. 10.

Other methods that capture motion rely on specialized sensors (944) placed on a performer's joints, such as via a sensor body suit (940). Once motion has been filmed or analyzed, a data set is produced to interpret that movement into Cartesian coordinates. These coordinates provide the spatial location of each of those markers. This information is then cleaned up and input to an animation package.

FIG. 10 illustrates a video camera (1005) and a standing conductor (1015) (or performing musician to be tracked or virtually linked to perform), with or without a blue screen (1010) behind him. The video camera (1005) feeds a video signal to the video processing system (1020) that utilizes signal processing to provide signal pattern recognition capability. The blue in the screen is filtered out in the signal processing such as by an Ultimatte process.

In one embodiment, the conductor is wearing a sensor equipped body suit (940) and gloves (935) of FIG. 9. In another embodiment, the conductor is wearing only the sensor equipped gloves (935) of FIG. 9. In still another embodiment, the conductor's movements are picked up by the video camera (1005) and processed without a sensor suit.

Simple things, like looking for the conductor's rapid hand movements, focusing on specific hand movement areas, facial and head movement, arm movements, and body language can all be programmed into the recognition knowledge base. Some of the technology for complete mapping of body movement that exists in making video games of today are illustrated in *Video Systems* magazine, page 42, October 1995, Vol. 21, No. 11, and *NEXT Generation* magazine, pages 49-54, October 1995, both incorporated herein by reference.

In any event, having now obtained knowledge related to recognition of the movements, the system can interpret them and utilize them to convey presentation information to the ensemble or orchestra or studio members, or to analyze a performer's movements, or to permit a virtual performance. One example would be a large screen television or multiple large screen televisions for viewing by the members of the viewing group. Alternatively, each music stand could provide for a picture in picture display of special movements of the conductor in areas of the display where music is not currently being played. Since the stand can have the intelligence to compare the performed music to the played music, that embodiment permits display of the message in portions of the music display area which have already been performed or are not going to be performed for some time (e.g., at least ten seconds in either direction; other criteria could alternatively be used, and can be set up for desired characteristics of the performing environment).

Voice recognition and response to conductor commentary can supplement the system. The system could record the message, interpret to whom the conductor directed the message and convey it audibly or translate it into a text or icon display as a part of the system's audiovisual presentation.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system for use by a plurality of users having different roles, the system providing a display presentation, comprising:
 a plurality of workstations, each workstation comprising:
  a communication interface configured to communicate with another one of the workstations;
  memory configured to store image data;
  an input device configured to receive input data related to a role of a user using the input device, the input data is used to specify a subset of the image data pertinent to the role of the user; and
  a processing subsystem responsive to the memory for generating a display presentation output based at least in part upon the subset of the image data;

wherein the workstations are configured to share the image data and provide the display presentation for the user based upon the role of the user.

2. The system of claim 1 wherein the input device is configured to receive a user performance and generates user performance data concurrent to the local visual display presentation output.

3. The system of claim 2 wherein the system is configured to obtain expected user performance data from the display presentation output, and compares the expected performance data to the user performance data and provides a display presentation output of differences between the expected user performance data and the user performance data.

4. The system of claim 2 wherein the workstations include first and second workstations, further comprising: combining logic responsive to the user performance data from the workstations, to provide a combined output of composite virtual performance data, the combining logic configured to synchronize and combine the user performance data from the first workstation to generate the composite virtual performance data and communicate the composite virtual performance data to the second workstation, at least one of the first and second workstations provides at least one of an audio display, a visual display, and an audiovisual display, representative of the combination of the user performance data of the workstations, responsive to the composite virtual performance data.

5. The system of claim 1 wherein:
the image data is music data;
the input device is configured to receive changes to create modified music data; and
a first workstation communicates the modified music data to a second workstation, wherein the second workstation provides a local display presentation representative of a visual image of a selected musical composition along with the changes, responsive to the modified music data.

6. The system of claim 1 wherein the workstations include first and second workstations, and the input data includes edit data, the edit data is distributed from the first work station to the second workstation, and wherein the second workstation provides a local video presentation of the image data and of the changes, responsive to the edit data.

7. The system of claim 6 wherein the workstations are associated into subsets; wherein each of the workstations is associated with at least one of the subsets; and wherein the workstations in a defined subset share edit data and image data and provide a local display presentation responsive to the edit data and the image data.

8. The system of claim 7 wherein the first workstation is a master that communicates edit data to the second workstation.

9. The system of claim 8 wherein the master is configured for use by at least one of a conductor, band leader, teacher, manager, group leader, librarian, group member, and composer.

10. The system of claim 1 wherein the input data includes edits to the visual image, the edits alter an aspect of the display presentation output.

11. The system of claim 10 wherein the workstations are programmably restricted to prevent edits based on a defined level of permission.

12. The system of claim 1 wherein the first and second workstations communicate bi-directionally and in approximately real-time.

13. The system of claim 1 wherein the input device is configured to receive edits from a user changing of a portion of the display presentation output.

14. The system of claim 13 wherein the edits are at least one of an audio stimulus, an analog signal, digital data, a switch, a touch input device, motion sensor, motion capture data, and speech recognition.

15. The system of claim 1 wherein the workstations include first and second workstations, and the image data further comprises type data; the first workstation is programmed with an associated type so as to selectively communicate with the second workstation based upon the type data.

16. The system of claim 15 wherein the type data relates to a type of musical instrument.

17. The system of claim 15 wherein the first workstation further comprises a receiver that provides addressably selective communication responsive to the type data and the associated type for the first workstation.

18. The system of claim 15 wherein the type data defines a specific user type, and at least one of the workstations is configured to respond to input directed to a specific user type, the input comprises at least one of preprogramming, a switch, an audio input, a direct line input, control data, user programming, and remote program control.

19. The system of claim 1 wherein the subset of the image data is defined according to a role of the first workstation relative to the second workstation.

20. The system of claim 19 wherein the workstations provide a musical display to a plurality of musicians in a musical performance group, and the role is a musical role.

21. The system of claim 1 wherein the communication interface delivers the subset of image data to at least one subgroup of workstations according to the input data.

22. The system of claim 1 wherein the first workstation is a master workstation configured to provide controlled addressable communications of the image data to the second workstation.

23. The system of claim 22 wherein the master workstation is in communication with the plurality of workstations.

24. The system of claim 1 wherein the input data comprises at least one of audible performance data, visual performance data, electrical signals, digital data and control data.

25. The system of claim 1, further comprising: a source of video data representative of a video image; the display presentation output comprises a display of the video image as a picture-in-picture within a portion of the display presentation output.

26. The system of claim 1 wherein the input device receives at least one of an audio performance, digital data, analog data, a switch, a touch input device, a motion sensor, vocal input, or speech input.

27. A method of communicating among a plurality of workstations, usable by a plurality of users, comprising:
receiving data at a first workstation related to a role of a first user and a second user;
displaying image data at the first workstation, the image data represents at least one visual image related to the role of the first user;
generating locally generated data related to the displayed image data, at least a portion of the locally generated data indicates a portion of the image data related to the role of the first user;
generating a first display presentation adjusted for the role of the first user and incorporating the image data and the locally generated data;
displaying the first display presentation at the first workstation; and
distributing the locally generated data from the first workstation to a second workstation, the second workstation being configured to generate a second display presentation based upon a role of at least one of the first and second users.

28. The method of claim 27, further comprising generating user performance data from a user input provided substantially concurrent to displaying the image data.

29. The method of claim 28, further comprising displaying a presentation of differences between an expected output of user performance data based upon the image data compared to the user performance data.

30. The method of claim 28, further comprising:
combining user performance data from the plurality of workstations to provide composite virtual performance data; wherein the combining comprises synchronizing the user performance data from the plurality of workstations to generate the composite virtual performance data;
communicating the composite virtual performance data to the second workstation; and
providing a local presentation of the composite virtual performance data at the second workstation in the form of at least one of an audio display, a visual display, and an audiovisual display.

31. The method of claim 27 wherein the image data is music data; the locally generated data comprises changes to create modified music data; the method further comprising:
communicating the modified music data to the second workstation; and
displaying a local display presentation at the second workstation representative of the image data and the modified music data.

32. The method of claim 27 wherein the locally generated data comprises edit data, the method further comprising:
distributing the edit data to the second workstation, wherein the second workstation displays a local video presentation based at least in part upon the edit data and the image data.

33. The method of claim 32 wherein the workstations are divided into defined subsets and the workstations in a defined subset distribute the edit data among the subset and a workstation in the defined subset displays a local display based upon the edit data.

34. A computer-readable storage medium whose contents cause a computing system to perform a method comprising:
storing an image for display to a plurality of users;
receiving an input from a first user and a second user related to a role of the first user and the second user;
receiving performance data input from the first user and the second user;
sharing among a plurality of display subsystems the role of the first user and the role of the second user, the performance data from the first user, and the performance data from the second user; and
displaying the image to the first and second user on the plurality of display subsystems, wherein the image displayed to the first user is modified according to the role of the first user and the role of the second user, and according to the performance data of the first user and the performance data of the second user.

35. The method of claim 34, further comprising:
processing the performance data of each of the plurality of display subsystems to create discrete time samples;
synchronizing the discrete time samples;
combining the synchronized discrete time samples into combined virtual user data;
distributing the combined virtual user data to create a local presentation comprised of at least one of an audio presentation, a visual presentation, and an audiovisual presentation, based at least in part upon the combined virtual user data; and
displaying the local presentation on at least one of the plurality of display subsystems.

36. The method of claim 34, wherein the local presentation is representative of notation for a user performance, comprising at least one of musical notation conveying performance information to the user and non-musical notation conveying performance information to the user.

37. The method of claim 34 wherein the display subsystems are individual music workstations, and wherein the combined virtual user data represents combined individual musical performances.

38. A system comprising:
a first subsystem comprising:
memory configured to store and retrieve display data utilized to generate a visual representation of an image;
a communications subsystem providing an interface for communication of data for storage in and retrieval from the memory;
an input apparatus configured to receive user input that comprises changes to portions of the visual display presentation, the user input being related to a role of the user, wherein the user input is used to create a modified visual display presentation according to the changes and the role of the user, and wherein the user input is stored in the memory;
a processing subsystem coupled to the memory and configured to process at least one of the display data and the user input to provide presentation data;
a presentation apparatus providing a visual display presentation of a visual image responsive to the presentation data and corresponding to the display data and to the user input;
a communications interface configured to communicate with a second subsystem;
wherein the second subsystem is configured to provide a visual display presentation of the modified visual display presentation responsive to the communications interface.

39. The system of claim 38 wherein the processing subsystem provides a sequencing of a plurality of sub-portions of the visual display presentation responsive to the user input.

40. The system of claim 38 wherein the input apparatus comprises at least one of a touch-screen video display, a hands-free interface, a footswitch, an instrument input, a keyboard, a mouse, an audio input, a source of an analog signal, a source of a digital data, a switch, a touch input device, a motion sensor, a source of motion capture data, and a microphone.

41. The system of claim 38 wherein the first and second subsystems are physically located at different locations,
wherein the subsystems are configured to integrate simultaneous user input as provided from the different locations of the subsystems, into a combined data, wherein the first subsystem provides accepting of the respective input data from the second subsystem;
wherein the first and second subsystems are configured to process the input data into respective discrete time samples;
wherein the first subsystem is configured to provide communication of its respective discrete time samples to the second subsystem;
wherein the first subsystem is configured to synchronize the respective discrete time samples communicated from the second subsystem to provide synchronized communicated time samples:

wherein the first and second subsystems are configured to combine of the synchronized communication time samples into combined virtual data; and wherein the first and second subsystems are configured to provide a presentation of a display presentation responsive to the combined virtual data.

42. The system of claim 41 wherein the first display subsystem is configured to provide a common time reference signal and utilize the common time reference signal to synchronize the discrete time samples from the first and second subsystems.

43. The system of claim 38 wherein the input apparatus provides multiple different signals, wherein the visual display presentation changes over time to display each respective one of a plurality of locations, wherein the multiple different signals provide control of movement of the visual display presentation as among and within the plurality of locations to provide at least one of forward movement to a respective one of the plurality of locations, backward movement to a respective one of the plurality of locations, and movement to a marked location of a respective one of the plurality of locations.

44. The system of claim 38 wherein the second subsystem is configured to provide controlled addressable communications for selectively receiving the user input.

45. The system of claim 44, wherein the addressable communications of the user input is selectably addressable to defined subgroups of defined subsystems; and wherein the addressable communications is configured to provide a mapping to the subsystems within each of the subgroups.

* * * * *